US009329440B2

(12) United States Patent
Lee et al.

(10) Patent No.: US 9,329,440 B2
(45) Date of Patent: May 3, 2016

(54) PIXEL STRUCTURE

(71) Applicant: Au Optronics Corporation, Hsinchu (TW)

(72) Inventors: Yi-Chi Lee, Taichung (TW); Mei-Ju Lu, Kaohsiung (TW); Wei-Cheng Cheng, New Taipei (TW); Tien-Lun Ting, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 57 days.

(21) Appl. No.: 14/294,173

(22) Filed: Jun. 3, 2014

(65) Prior Publication Data

US 2015/0070644 A1 Mar. 12, 2015

(30) Foreign Application Priority Data

Sep. 12, 2013 (TW) .............................. 102133048 A

(51) Int. Cl.
*G02F 1/1343* (2006.01)
*G02F 1/1337* (2006.01)

(52) U.S. Cl.
CPC .... *G02F 1/134309* (2013.01); *G02F 1/134363* (2013.01); *G02F 2001/134372* (2013.01)

(58) Field of Classification Search
CPC .............. G02F 1/133707; G02F 2001/134372; G02F 1/134309; G02F 2001/134318; G02F 1/134363
USPC ................................. 349/141, 143, 146, 129
See application file for complete search history.

(56) References Cited

U.S. PATENT DOCUMENTS

| 6,646,707 | B2 | 11/2003 | Noh et al. |
| 7,929,097 | B1 | 4/2011 | Choi et al. |
| 8,164,094 | B2 | 4/2012 | Liou et al. |
| 8,633,879 | B2* | 1/2014 | Gu .................... G02F 1/133512 345/87 |
| 2008/0151169 | A1* | 6/2008 | Park .................. G02F 1/134363 349/143 |
| 2009/0244467 | A1* | 10/2009 | Nomura ............ G02F 1/134363 349/141 |
| 2011/0175093 | A1 | 7/2011 | Liou et al. |

FOREIGN PATENT DOCUMENTS

| CN | 103135294 | 6/2013 |
| TW | 200624917 | 7/2006 |
| TW | M387373 | 8/2010 |
| TW | 201202792 | 1/2012 |
| TW | 201329591 | 7/2013 |
| TW | I421576 | 1/2014 |
| TW | 201421130 | 6/2014 |

* cited by examiner

*Primary Examiner* — Nathanael R Briggs
(74) *Attorney, Agent, or Firm* — Jianq Chyun IP Office

(57) ABSTRACT

A pixel structure includes a scan line, a data line, an active device, a first electrode layer, a second electrode layer, and an insulation layer. The active device is electrically connected to the scan line and the data line. The first electrode layer is electrically connected to the active device. The second electrode layer is electrically insulated from the first electrode layer. The insulation layer is located between the first electrode layer and the second electrode layer, and the first electrode layer or the second electrode layer includes an enclosed-frame-shaped portion, first V-shaped branch portions, and second V-shaped branch portions. The first V-shaped branch portions and the second V-shaped branch portions are arranged within the enclosed-frame-shaped portion in opposite directions, and end terminals of the first V-shaped branch portions and end terminals of the second V-shaped branch portions are connected to the enclosed-frame-shaped portion.

24 Claims, 20 Drawing Sheets

PIXEL STRUCTURE

CROSS-REFERENCE TO RELATED APPLICATION

This application claims the priority benefit of Taiwan application serial no. 102133048, filed on Sep. 12, 2013. The entirety of the above-mentioned patent application is hereby incorporated by reference herein and made a part of this specification.

BACKGROUND OF THE INVENTION

1. Field of the Invention

The invention relates to a pixel structure panel; more particularly, the invention relates to a pixel structure capable of reducing disclination lines or disclination nodes in a liquid crystal display (LCD) panel.

2. Description of Related Art

With the continuous advancement of large-sized LCDs, the LCDs are required to be characterized by high contrast ratio, fast response speed, wide viewing angle, and so forth. In order to resolve the issue with respect to the viewing angle of the large-sized LCD panels, the technique of wide viewing angle must keep on advancing and developing. Common displays employing the technique of wide viewing angle include twisted nematic (TN) liquid crystals with wide viewing films, in-plane switching (IPS) LCD panels, fringe field switching (FFS) LCD panels, and multi-domain vertical alignment (MVA) LCD panels.

For instance, the FFS LCD panel has advantages of wide viewing angle and low color shift. In a conventional FFS LCD panel, however, electric field sensed by liquid crystal molecules above pixel electrodes is different from electric field sensed by liquid crystal molecules above alignment slits among branch portions of the pixel electrodes, such that said liquid crystal molecules at different locations may be tilted in different directions, which may lead to unexpected disclination lines or disclination nodes and further reduce transmittance of the LCD panel. As a result, how to develop the pixel structure with satisfactory transmittance without triggering the issue of disclination lines or disclination nodes has become one of the research topics in the pertinent field.

SUMMARY OF THE INVENTION

The invention is directed to a pixel structure that is characterized by favorable transmittance and is not apt to encounter the issue of disclination lines or disclination nodes.

In an embodiment of the invention, a pixel structure that includes a scan line, a data line, an active device, a first electrode layer, a second electrode layer, and an insulation layer is provided. The active device is electrically connected to the scan line and the data line. The first electrode layer is electrically connected to the active device. The second electrode layer is electrically insulated from the first electrode layer. The insulation layer is located between the first electrode layer and the second electrode layer, and the first electrode layer or the second electrode layer includes an enclosed-frame-shaped portion, a plurality of first V-shaped branch portions, and a plurality of second V-shaped branch portions. The first V-shaped branch portions and the second V-shaped branch portions are arranged within the enclosed-frame-shaped portion in opposite directions, and end terminals of the first V-shaped branch portions and end terminals of the second V-shaped branch portions are connected to the enclosed-frame-shaped portion.

As discussed above, in the pixel structure described herein, the conventional issue that the liquid crystal molecules above pixel electrodes are tilted in a direction different from that of the liquid crystal molecules above alignment slits does not arise. That is, in the pixel structure described herein, the liquid crystal molecules above the pixel electrodes and the liquid crystal molecules above the alignment slits are tilted in the same direction, such that the pixel structure provided herein may have favorable transmittance without triggering the issue of disclination lines or disclination nodes. As such, the resultant LCD panel may have sufficient transmittance and satisfactory display quality.

Several exemplary embodiments accompanied with figures are described in detail below to further describe the invention in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
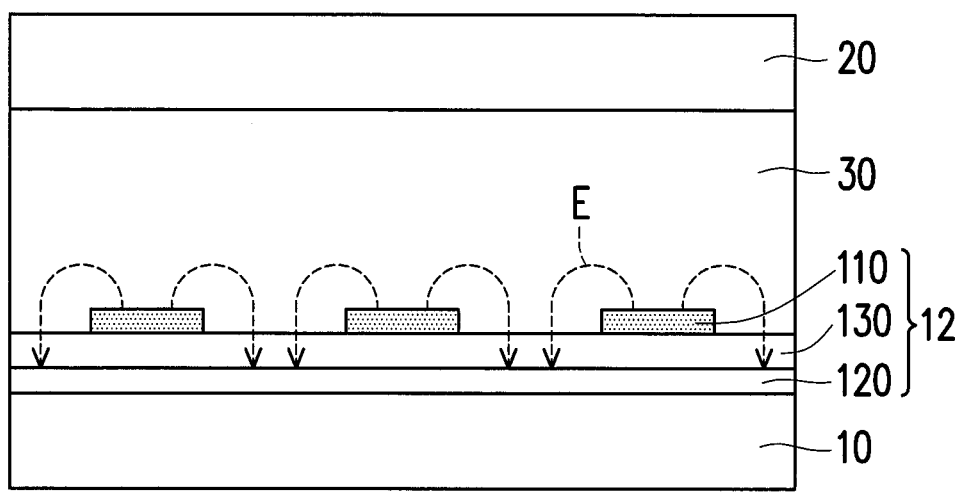
FIG. 1 is a schematic cross-sectional view illustrating an LCD panel according to an embodiment of the invention.
Figure 2:
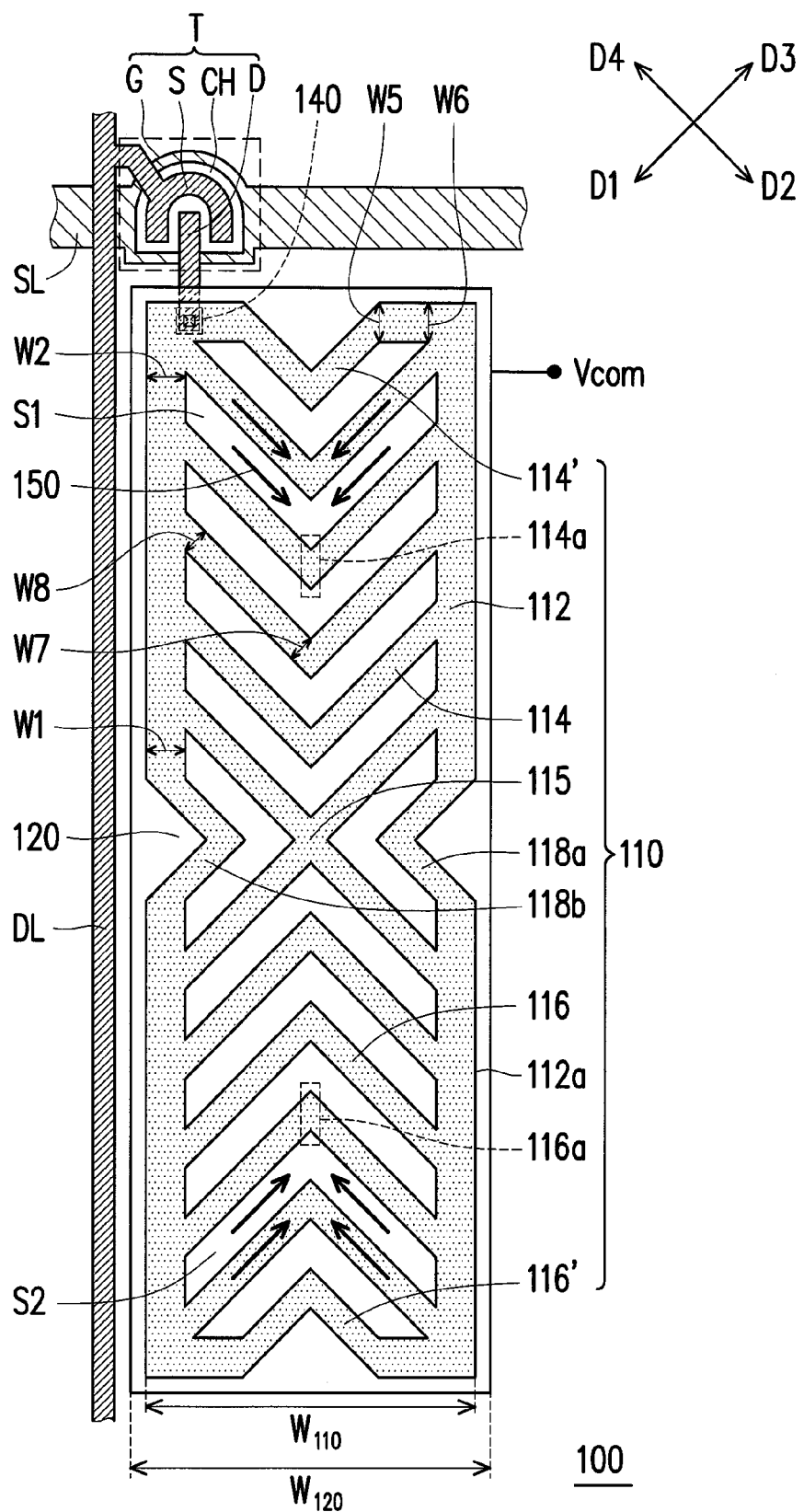
FIG. 2 is a schematic top view illustrating a pixel structure according to a first embodiment of the invention.

FIG. 1 is a schematic cross-sectional view illustrating an LCD panel 50 according to an embodiment of the invention. FIG. 2 is a schematic top view illustrating a pixel structure 100 according to a first embodiment of the invention. For illustrative purposes, FIG. 2 merely shows one pixel structure 100 in a pixel array layer 12 of the LCD panel 50 in FIG. 1, and people skilled in the art should be able to understand that the pixel array layer 12 depicted in FIG. 1 is constituted by plural pixel structures 100 (shown in FIG. 2) arranged in arrays. Besides, FIG. 1 merely illustrates several components of the pixel structure 100, and the scan line SL, the data line DL, and the active device T are not shown in FIG. 1. The detailed structure and components of the pixel structure 100 are provided in FIG. 2.

The LCD panel 50 is a vertical alignment-fringe field switching (VA-FFS) LCD panel, for instance, and the VA-FFS LCD panel is characterized by both high contrast ratio (i.e., the feature of the vertical alignment LCD panel) and wide viewing angle (i.e.; the feature of the FFS LCD panel). Note that the LCD panel 50 described below refers to the exemplary VA-FFS LCD panel.

With reference to FIG. 1 and FIG. 2, the LCD panel 50 includes a first substrate 10, a pixel array layer 12, a second substrate 20, and a liquid crystal material 30.

The first substrate 10 may be made of glass, quartz, an organic polymer, metal, and so on. Besides, the first substrate 10 includes the pixel array layer 12 thereon, and the pixel array layer 12 is constituted by plural pixel structures and will be elaborated below.

The second substrate 20 is located opposite to the first substrate 10. Here, the second substrate 20 may be made of glass, quartz, an organic polymer, and so on. In another embodiment, a color filter array layer (not shown) including red, green, and blue filter patterns may be further configured on the second substrate 20. Moreover, the second substrate 20 may further include a light shielding layer (not shown, also referred to as a black matrix) located among patterns of the color filter array layer.

The liquid crystal material 30 is located between the second substrate 20 and the pixel array layer 12 on the first substrate 10. Here, the liquid crystal material 30 includes a plurality of liquid crystal molecules (not shown). For instance, the liquid crystal molecules are negative-type vertically aligned liquid crystal molecules. Since the dielectric anisotropy $\Delta \in$ of the negative-type vertically aligned liquid crystal molecules is less than 0, and the vertically aligned liquid crystal molecules are characterized by high contrast ratio, the negative-type vertically aligned liquid crystal molecules may effectively increase the contrast ratio and reduce the color shift.

When the LCD panel 50 is the VA-FFS LCD panel, and no voltage is applied thereto, the liquid crystal molecules are vertically aligned. When a voltage is applied, the liquid crystal molecules are tilted in directions D1 to D4 (e.g., the tilt direction 150 shown in FIG. 2) on a horizontal plane, and the resultant multiple alignment is conducive to resolving the color shift issue. The liquid crystal molecules are also tilted along a direction of electric field E. The electric field E described herein refers to a fringe electric field resulting from the voltage difference between the first electrode layer 110 and the second electrode layer 120. Here, the first electrode layer 110 is electrically insulated from the second electrode layer 120, and an insulation layer 130 is located between the first electrode layer 110 and the second electrode layer 120. The design of the first electrode layer 110, the second electrode layer 120, and the insulation layer 130 will be elaborated hereinafter.

Detailed descriptions of the pixel structure 100 will also be provided below. The pixel structure 100 includes a scan line SL, a data line DL, an active device T, a first electrode layer 110, a second electrode layer 120, and an insulation layer 130.

An extension direction of the scan line SL is different from that of the data line DL; preferably, the extension direction of the scan line SL is perpendicular to that of the data line DL. Besides, the scan line SL and the data line DL are located in different film layers, and an insulation layer (not shown) is sandwiched by the scan line SL and the data line DL. The scan line SL and the data line DL serve to transmit driver signals for driving the pixel structure 100. In most cases, the scan line SL and the data line DL are made of metal. Nevertheless, the invention should not be construed as limited to the embodiment set forth herein. According to other embodiments of the invention, the scan line SL and the data line DL may also be made of other conductive materials, such as alloy, metal oxide, metal nitride, metal oxynitride, or a stacked layer of metal and other conductive materials.

The active device T is electrically connected to the scan line SL and the data line DL. Here, the active device T is a thin film transistor (TFT) that includes a gate G, a channel layer CH, a source S, and a drain D. The gate G and the scan line SL are electrically connected, and the source S and the data line DL are electrically connected. Namely, when a control signal is input to the scan line SL, the scan line SL and the gate G are mutually electrically conductive with each other; when a control signal is input to the data line DL, the data line DL and the source S are mutually electrically conductive with each other. The channel layer CH is located above the gate G and below the source S and the drain D. In the present embodiment, the active device T is, for instance, a bottom-gate thin film transistor (TFT), which should however not be construed as a limitation to the invention. In another embodiment of the invention, the active device T may also be a top-gate TFT.

The gate G of the active device T is further covered by an insulation layer (not shown) which may also be referred to as a gate insulation layer. Besides, the active device may also be covered by another insulation layer (i.e., the insulation layer 130) which may also be referred to as a protection layer. A material of the gate insulation layer and the protection layer includes an inorganic material, an organic material, or a combination thereof, for instance. The inorganic material includes silicon oxide, silicon nitride, silicon oxynitride, or a stacked layer containing at least two of the above-mentioned materials, for instance.

The first electrode layer 110 is electrically connected to the active device T. To be specific, the first electrode layer 110 may be electrically connected to the drain D of the active device T through a contact window 140 that goes through the insulation layer 130. The first electrode layer 110 is, for instance, a patterned pixel electrode; hence, the first electrode layer 110 may be a transparent conductive layer that includes metal oxide, e.g., indium tin oxide, indium zinc oxide, aluminum tin oxide, aluminum zinc oxide, indium germanium zinc oxide, other appropriate oxide, or a stacked layer containing at least two of the above.

The first electrode layer 110 includes enclosed-frame-shaped portion 112, a plurality of first V-shaped branch portions 114, and a plurality of second V-shaped branch portions 116.

The first V-shaped branch portions 114 and the second V-shaped branch portions 116 are arranged within the enclosed-frame-shaped portion 112 in opposite directions, and end terminals of the first V-shaped branch portions 114 and end terminals of the second V-shaped branch portions 116 are connected to the enclosed-frame-shaped portion 112. In particular, each of the first V-shaped branch portions 114 has a first central part 114a, each of the second V-shaped branch portions 116 has a second central part 116a, and the first central parts 114a and the second central parts 116a are arranged in opposite directions. According to the present embodiment, the first central parts 114a and the second central parts 116a have pointed-end patterns, for instance. Here, a width W8 of the end terminal of each of the first V-shaped branch portions 114 is equal to a width W7 of the first central part 114a of each of the first V-shaped branch portions 114, and a width W8 of the end terminal of each of the second V-shaped branch portions 116 is equal to a width W7 of the second central part 116a of each of the second V-shaped branch portions 116. Here, the end terminals of the first V-shaped branch portions 114 and the end terminals of the second V-shaped branch portions 116 are arranged in opposite directions, which should however not be construed as a limitation to the invention; in another embodiment of the invention, the end terminals of the first V-shaped branch portions 114 and the end terminals of the second V-shaped branch portions 116 may also be mirror-symmetrical. Since the first V-shaped branch portions 114 and the second V-shaped branch portions 116 are arranged in opposite directions, the symmetrical viewing angle may be obtained, and the impact of color shift may be lessened.

In the present embodiment, the end terminals of the first V-shaped branch portions 114 and the end terminals of the second V-shaped branch portions 116 do not protrude from the enclosed-frame-shaped portion 112, such that the enclosed-frame-shaped portion 112 has an outer edge 112a shaped as a straight line. Thereby, the outer electric field may stay uniform, and the outer electric field is slightly lower than the inner electric field, so as to ensure that the liquid crystal molecules may be tilted in a proper direction. In the present embodiment, the first V-shaped branch portions 114 and the second V-shaped branch portions 116 have the same width. Besides, the adjacent first and second V-shaped branch portions 114 and 116 are connected to constitute a crisscross-shaped pattern. A first V-shaped slit S1 is located between two of the adjacent first V-shaped branch portions 114, a second V-shaped slit S2 is located between two of the adjacent second V-shaped branch portions 116, and the first V-shaped slits S1 and the second V-shaped slits S2 are arranged within the enclosed-frame-shaped portion 112 in opposite directions. Accordingly, since the first electrode layer 110 described herein has the first V-shaped branch portions 114, the second V-shaped branch portions 116, the first V-shaped slits S1, and the second V-shaped slits S2, four alignment regions may be formed, and the liquid crystal molecules in the liquid crystal material 30 are tilted along directions D1 to D4 (e.g., the tilt direction 150 shown in FIG. 2), respectively. For instance, the direction D1 is 45-degree direction, which should however not be construed as a limitation to the invention; the direction D1 may also be a 43-degree direction or a 47-degree direction.

The enclosed-frame-shaped portion 112 has a first recess pattern 118a and a second recess pattern 118b arranged in opposite directions. In the present embodiment, the first and second access patterns 118a and 118b are symmetrical, while the first and second access patterns 118a and 118b in another embodiment may be asymmetrical. The first and second recess patterns 118a and 118b are located between the adjacent first and second V-shaped branch portions 114 and 116. Owing to the design of the first and second recess patterns 118a and 118b, the overlaying liquid crystal molecules may be tilted in a proper direction, and simultaneously the appropriateness of the viewing angle may be guaranteed. Besides, in the present embodiment, the enclosed-frame-shaped portion 112 has the outer edge shaped as a straight line; therefore, a width W1 of the enclosed-frame-shaped portion 112 adjacent to the first and second recess patterns 118a and 118b is equal to a width W2 of the enclosed-frame-shaped portion 112 away from the first and second recess patterns 118a and 118b. Namely, the width W1 is equal to the width W2 in the present embodiment. Thereby, the outer electric field may stay uniform, and the outer electric field is slightly lower than the inner electric field, so as to ensure that the liquid crystal molecules may be tilted in a proper direction.

The first V-shaped branch portions 114 include a farthest first V-shaped branch portion 114', and the second V-shaped branch portions 116 include a farthest second V-shaped branch portion 116'. Here, the farthest first V-shaped branch portion 114' and the farthest second V-shaped branch portion 116' are away from the first and second recess patterns 118a and 118b. According to the present embodiment, a width W5 of the enclosed-frame-shaped portion 112 adjacent to the farthest first and second V-shaped branch portions 114' and 116' is equal to a width W6 of the enclosed-frame-shaped portion 112 away from the farthest first and second V-shaped branch portions 114' and 116'.

Note that the first electrode layer 110 (i.e., the pixel electrode) described herein is equipped with the V-shaped branch portions and the V-shaped slits; therefore, the liquid crystal molecules above the V-shaped branch portions and the liquid crystal molecules above the V-shaped slits are tilted in the same direction (e.g., the tilt direction 150 shown in FIG. 2), such that the pixel structure provided herein may have favorable transmittance without triggering the issue of disclination lines or disclination nodes. Particularly, the liquid crystal molecules are tilted in the directions D1 to D4 on a horizontal plane; what is more, in each alignment region, the liquid crystal molecules above the V-shaped branch portions and the liquid crystal molecules above the V-shaped slits are tilted in the same direction. Therefore, due to the design of the V-shaped branch portions and the V-shaped slits in the pixel electrode, the liquid crystal molecules above the V-shaped branch portions and the liquid crystal molecules above the V-shaped slits may be tilted in the same direction, such that the disclination lines or disclination nodes at intersections between the branch portions and the slits may be prevented, and that the transmittance of the pixel structure may be improved.

The second electrode layer 120 is arranged opposite to the first electrode layer 110 and is electrically insulated from the first electrode layer 110. To be specific, the insulation layer 130 is located between the first electrode layer 110 and the second electrode layer 120, such that the first electrode layer 110 and the second electrode layer 120 are electrically insulated from each other. A material of the insulation layer 130 includes an inorganic material, an organic material, or a combination thereof, for instance. The inorganic material includes silicon oxide, silicon nitride, silicon oxynitride, or a stacked layer containing at least two of the above-mentioned materials, for instance. In the present embodiment, a width $W_{110}$ of the first electrode layer 110 is smaller than a width $W_{120}$ of the second electrode layer 120, for instance. Nevertheless, the invention should not be construed as limited to the embodiment set forth herein. In other embodiments of the invention, the width $W_{110}$ of the first electrode layer 110 may be equal to or greater than the width $W_{120}$ of the second electrode layer 120. Besides, in the present embodiment, the second electrode layer 120 is a common electrode electrically connected to a common voltage Vcom, for instance. The second electrode layer 120 may be a non-patterned electrode layer in the pixel structure 100 or in the entire pixel array layer 12, and a material of the second electrode layer 120 includes metal oxide, e.g., indium tin oxide, indium zinc oxide, aluminum tin oxide, aluminum zinc oxide, indium germanium zinc oxide, other appropriate oxide, or a stacked layer containing at least two of the above.

According to the present embodiment, the first electrode layer 110 and the active device T are electrically connected together, and the second electrode layer 120 and the common voltage Vcom are electrically connected, for instance. Nevertheless, the invention should not be construed as limited to the embodiment set forth herein. In another embodiment of the invention, the first electrode layer 110 may be electrically connected to the common voltage Vcom, and the second electrode layer 120 may be electrically connected to the drain D of the active device T through the contact window 140, given that there is a voltage difference between the first electrode layer 110 and the second electrode layer 120 so as to generate a fringe electric field for driving the liquid crystal molecules to be tilted in a direction of the electric field E.

In the first embodiment of the invention, the enclosed-frame-shaped portion 112 has the outer edge 112a shaped as a straight line, and the first V-shaped branch portions 114 and the second V-shaped branch portions 116 have the same width. Nevertheless, the invention should not be construed as limited to the embodiment set forth herein. In other embodiments of the invention, as described in the second embodiment to the fourth embodiment, the outer edge of the enclosed-frame-shaped portion 112 may also be shaped in another manner, and the widths of the V-shaped branch portions may also be different, which will be elaborated hereinafter.

Figure 3:
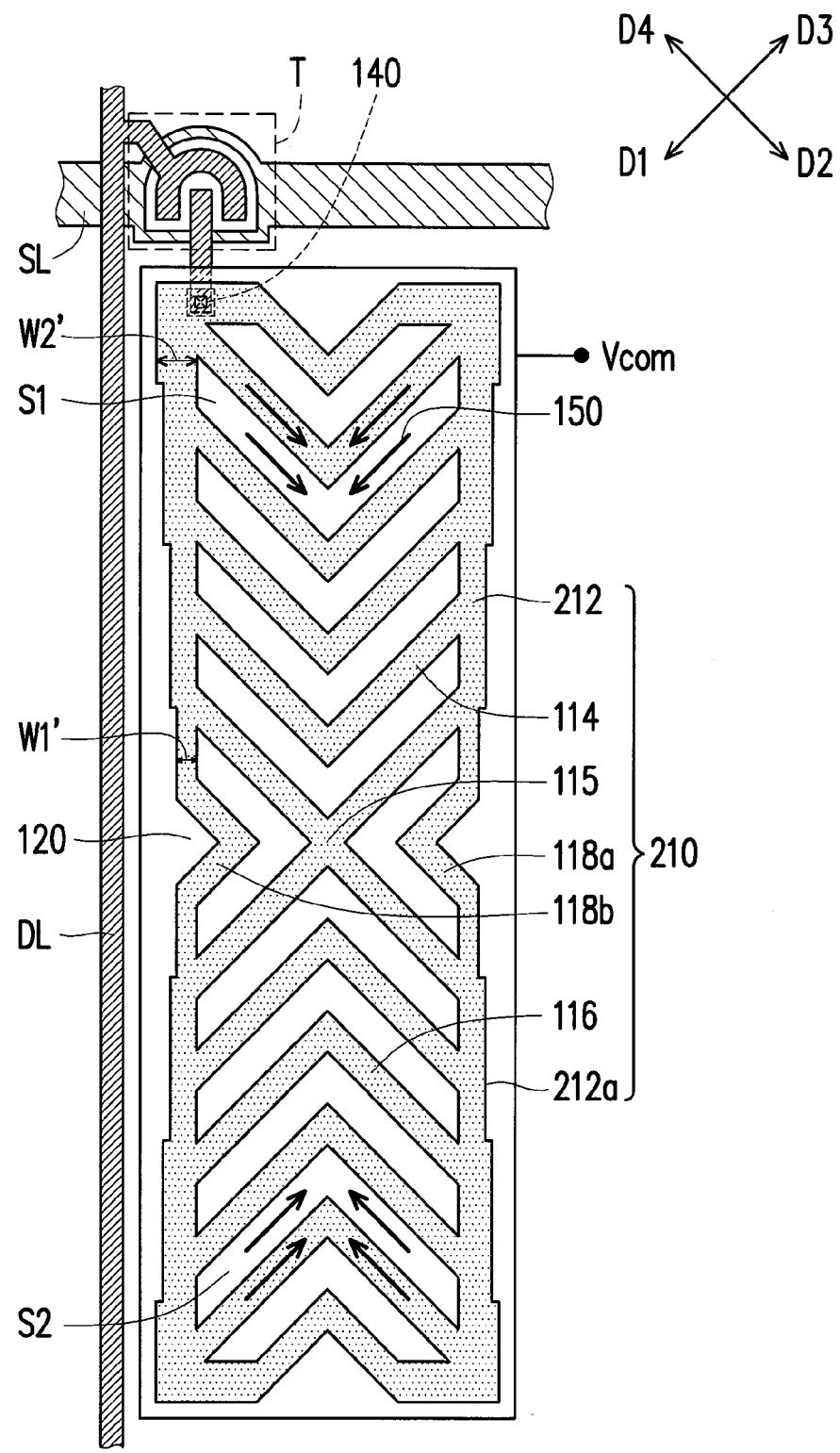
FIG. 3 is a schematic top view illustrating a pixel structure according to a second embodiment of the invention.

FIG. 3 is a schematic top view illustrating a pixel structure 200 according to a second embodiment of the invention. The embodiment depicted in FIG. 3 is similar to that depicted in FIG. 2; therefore, the identical or similar devices in these two embodiments are represented by the identical or similar reference numbers and will not be further explained. The difference between the embodiment depicted in FIG. 3 and the embodiment depicted in FIG. 2 lies in that the outer edge of the enclosed-frame-shaped portion is shaped in a different manner according to the present embodiment. To be specific, in FIG. 3, the enclosed-frame-shaped portion 212 of the first electrode layer 210 has a step-wise outer edge 212a; that is, the width of the enclosed-frame-shaped portion 212 discretely decreases. Hence, the width W1' of the enclosed-frame-shaped portion 212 adjacent to the first and second recess patterns 118a and 118b is smaller than the width W2' of the enclosed-frame-shaped portion 212 away from the first and second recess patterns 118a and 118b.

Note that the enclosed-frame-shaped portion 212 of the first electrode layer 210 described herein has the step-wise outer edge 212a, and the width W1' is smaller than the width W2'. Hence, the electric field at the enclosed-frame-shaped portion 212 with the wide width (i.e., the width W1') is weaker than the electric field at the enclosed-frame-shaped portion 212 with the narrow width (i.e., the width W2'). Said difference in density of the electric field is conducive to determination of the tilt direction of the liquid crystal molecules above the enclosed-frame-shaped portion 212.

Similarly, according to the embodiment shown in FIG. 3, the first electrode layer 210 and the active device T are electrically connected together, and the second electrode layer 120 is electrically connected to the common voltage Vcom, for instance. Nevertheless, the invention should not be construed as limited to the embodiment set forth herein. In another embodiment of the invention, the first electrode layer 210 may be electrically connected to the common voltage Vcom, and the second electrode layer 120 may be electrically connected to the drain D of the active device T through the contact window 140, given that there is a voltage difference between the first electrode layer 210 and the second electrode layer 120 so as to generate a fringe electric field for driving the liquid crystal molecules to be tilted in a direction of the electric field E.

Figure 4:
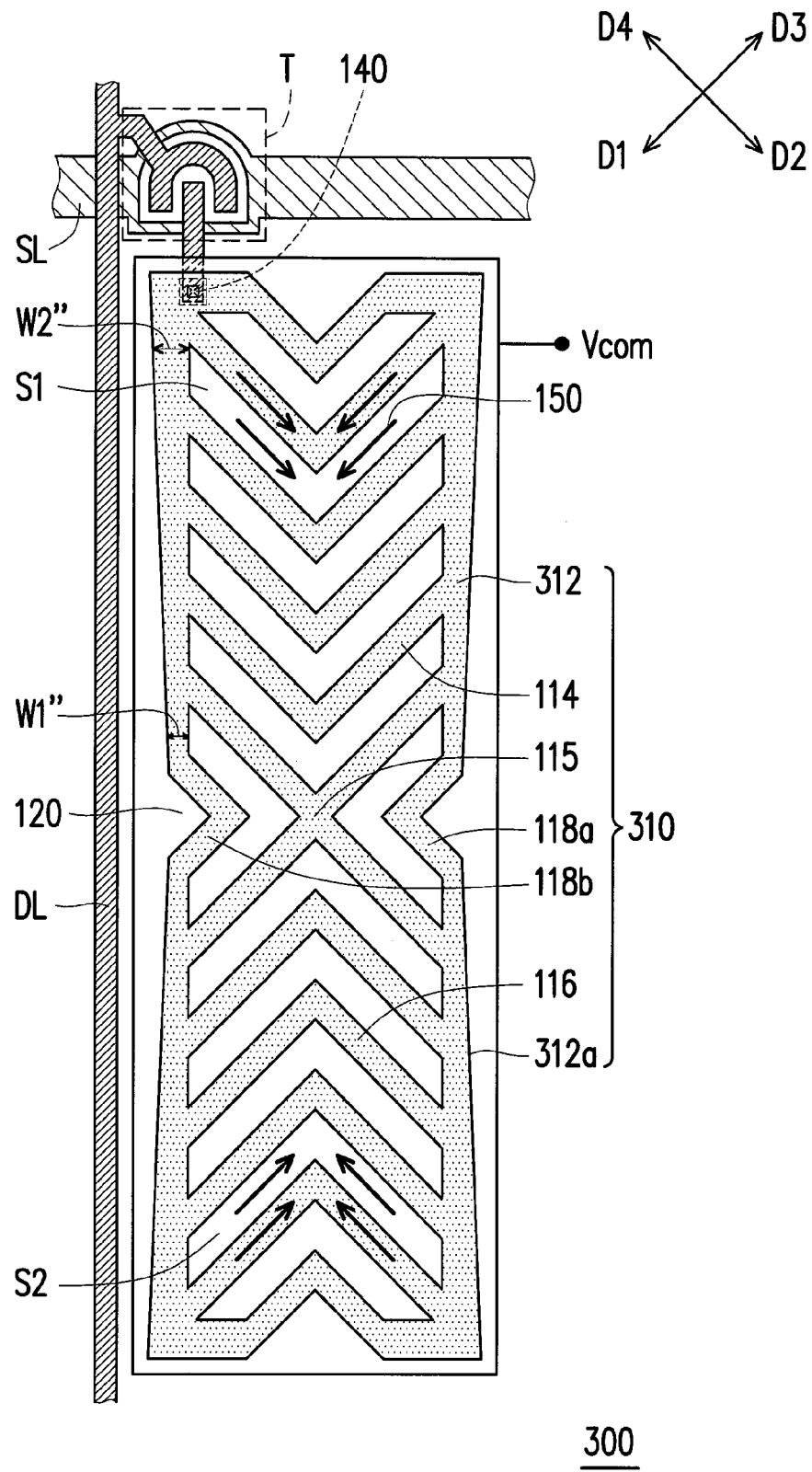
FIG. 4 is a schematic top view illustrating a pixel structure according to a third embodiment of the invention.

FIG. 4 is a schematic top view illustrating a pixel structure 300 according to a third embodiment of the invention. The embodiment depicted in FIG. 4 is similar to that depicted in FIG. 2; therefore, the identical or similar devices in these two embodiments are represented by the identical or similar reference numbers and will not be further explained. The difference between the embodiment depicted in FIG. 4 and the embodiment depicted in FIG. 2 lies in that the outer edge of the enclosed-frame-shaped portion is shaped in a different manner according to the present embodiment. To be specific, in FIG. 4, the enclosed-frame-shaped portion 312 of the first electrode layer 310 has a trapezoid outer edge 312a; that is, the width of the enclosed-frame-shaped portion 312 continuously decreases. Hence, the width of the enclosed-frame-shaped portion 312 gradually increases in a direction away from the first and second recess patterns 118a and 118b, and the width W1" is smaller than the width W2". That means, the width of the enclosed-frame-shaped portion 312 gradually increases in a direction from the first and second recess patterns 118a and 118b toward away the first and second recess patterns 118a and 118b.

Note that the enclosed-frame-shaped portion 312 of the first electrode layer 310 described herein has the trapezoid outer edge 312a, and the width W1" is smaller than the width W2". Hence, the electric field at the enclosed-frame-shaped portion 312 with the wide width (i.e., the width W2") is weaker than the electric field at the enclosed-frame-shaped portion 312 with the narrow width (i.e., the width W1"). Said difference in density of the electric field is conducive to determination of the tilt direction of the liquid crystal molecules above the enclosed-frame-shaped portion 312.

Similarly, according to the embodiment shown in FIG. 4, the first electrode layer 310 and the active device T are electrically connected together, and the second electrode layer 120 is electrically connected to the common voltage Vcom, for instance. Nevertheless, the invention should not be construed as limited to the embodiment set forth herein. In another embodiment of the invention, the first electrode layer 310 may be electrically connected to the common voltage Vcom, and the second electrode layer 120 may be electrically connected to the drain D of the active device T through the contact window 140, given that there is a voltage difference between the first electrode layer 310 and the second electrode layer 120 so as to generate a fringe electric field for driving the liquid crystal molecules to be tilted in a direction of the electric field E.

Figure 5:
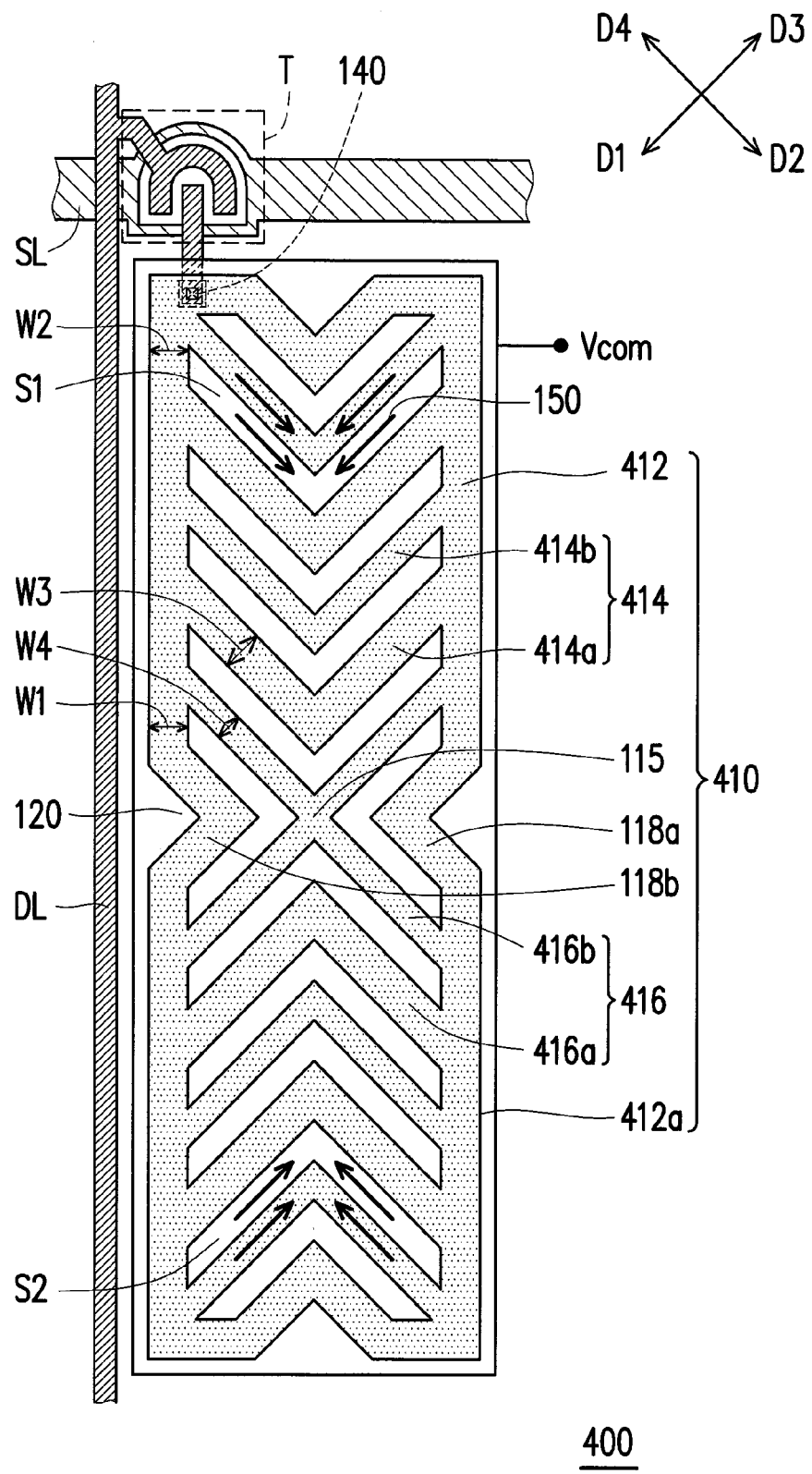
FIG. 5 is a schematic top view illustrating a pixel structure according to a fourth embodiment of the invention.

FIG. 5 is a schematic top view illustrating a pixel structure 400 according to a fourth embodiment of the invention. The embodiment depicted in FIG. 5 is similar to that depicted in FIG. 2; therefore, the identical or similar devices in these two embodiments are represented by the identical or similar reference numbers and will not be further explained. The difference between the embodiment depicted in FIG. 5 and the embodiment depicted in FIG. 2 lies in that the widths of the V-shaped branch portions are different in the present embodiment. Specifically, as shown in FIG. 5, the first V-shaped branch portions 414 include a plurality of first wide V-shaped branch portions 414a and a plurality of first narrow V-shaped branch portions 414b, and the first wide V-shaped branch portions 414a and the first narrow V-shaped branch portions 414b are alternately arranged. The second V-shaped branch portions 416 include a plurality of second wide V-shaped branch portions 416a and a plurality of second narrow V-shaped branch portions 416b, and the second wide V-shaped branch portions 416a and the second narrow V-shaped branch portions 416b are alternately arranged. That is, in the present embodiment, the V-shaped branch portions include wide and narrow V-shaped branch portions that are alternately arranged. Each of the first and second wide V-shaped branch portions 414a and 416a has the width W3, and each of the first and second narrow V-shaped branch portions 414b and 416b has the width W4. However, the invention is not limited thereto; in another embodiment of the invention, the first V-shaped branch portions may include the wide and narrow V-shaped branch portions which are alternately arranged, and the second V-shaped branch portions merely include the V-shaped branch portions with the same width.

Note that the V-shaped branch portions described in the present embodiment include the wide V-shaped branch portions (with the width W3) and the narrow V-shaped branch portions (with the width W4) that are alternately arranged. Hence, the electric field at the wide V-shaped branch portions (with the width W3 ) is weaker than the electric field at the narrow V-shaped branch portions (with the width W4). Said difference in density of the electric field is conducive to determination of the tilt direction of the liquid crystal molecules above the V-shaped branch portions.

In addition, it should also be mentioned that the enclosed-frame-shaped portion 412 of the first electrode layer 410 described herein has the outer edge 412a shaped as a straight line, and the width W1 is equal to the width W2. Nevertheless, the invention should not be construed as limited to the embodiment set forth herein. In other embodiments of the invention, the outer edge of the enclosed-frame-shaped portion 412 may also be shaped in another manner, e.g., in a step-wise manner or a trapezoid manner as described in the second embodiment or the third embodiment.

According to the embodiment shown in FIG. 5, the first electrode layer 410 and the active device T are electrically connected together, and the second electrode layer 120 is electrically connected to the common voltage Vcom, for instance. Nevertheless, the invention should not be construed as limited to the embodiment set forth herein. In another embodiment of the invention, the first electrode layer 410 may be electrically connected to the common voltage Vcom, and the second electrode layer 120 may be electrically connected to the drain D of the active device T through the contact window 140, given that there is a voltage difference between the first electrode layer 410 and the second electrode layer 120 so as to generate a fringe electric field for driving the liquid crystal molecules to be tilted in a direction of the electric field E.

In the previous embodiment, the width W5 of the enclosed-frame-shaped portion adjacent to the farthest V-shaped branch portion is equal to the width W6 of the enclosed-frame-shaped portion away from the farthest V-shaped branch portion, for instance. That is, the width W5 is equal to the width W6 . Nevertheless, the invention should not be construed as limited to the embodiment set forth herein. In other embodiments of the invention (e.g., in the fifth embodiment and another embodiment showing variations in said pixel structure), the width of the enclosed-frame-shaped portion adjacent to the farthest V-shaped branch portion may be different from the width of the enclosed-frame-shaped portion away from the farthest V-shaped branch portion, which will be elaborated hereinafter.

Figure 6:
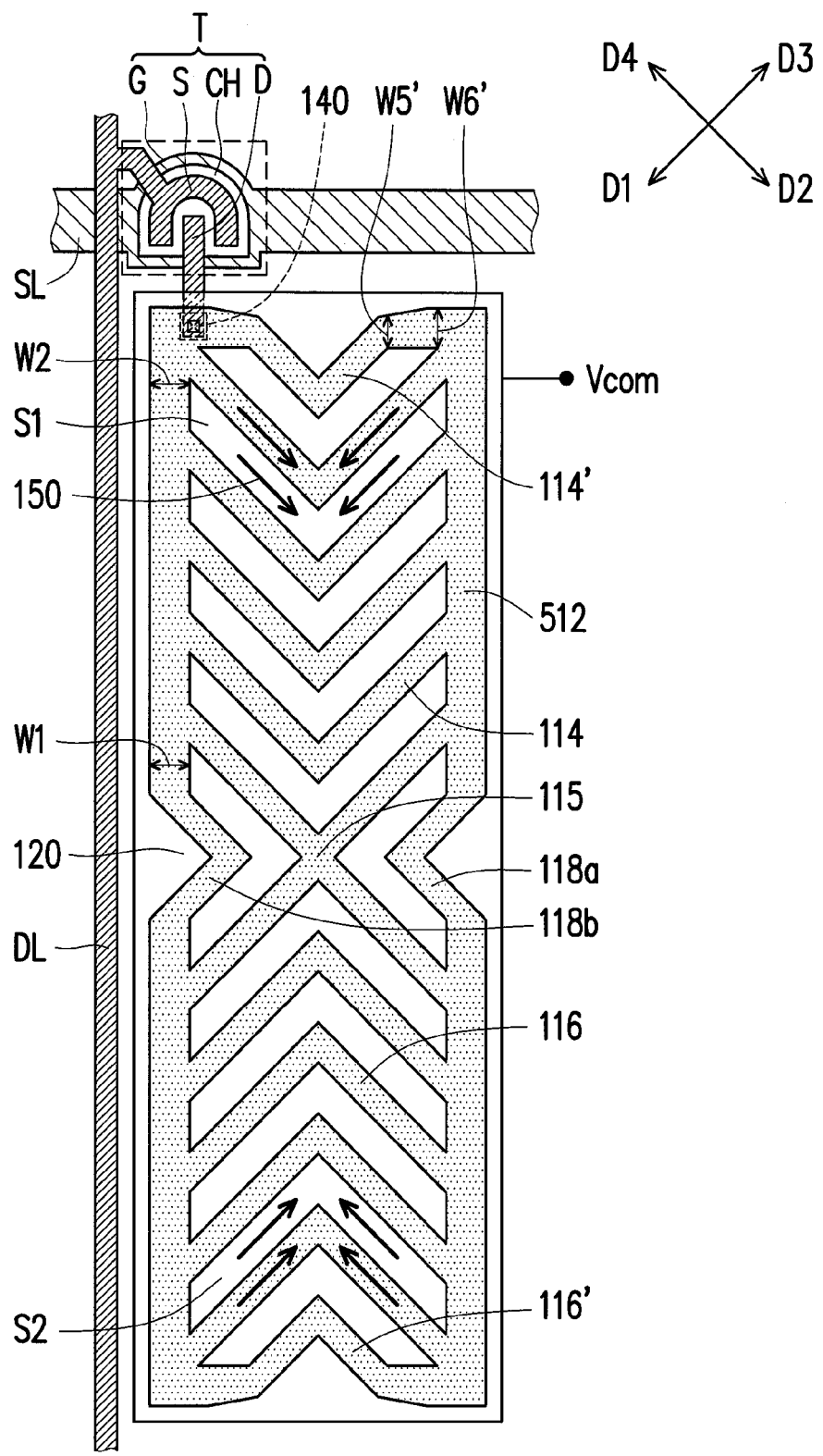
FIG. 6 is a schematic top view illustrating a pixel structure according to a fifth embodiment of the invention and FIG. 7 is schematic top view illustrating a pixel structure according to another embodiment showing variations in the pixel structure depicted in FIG. 6.
Figure 7:
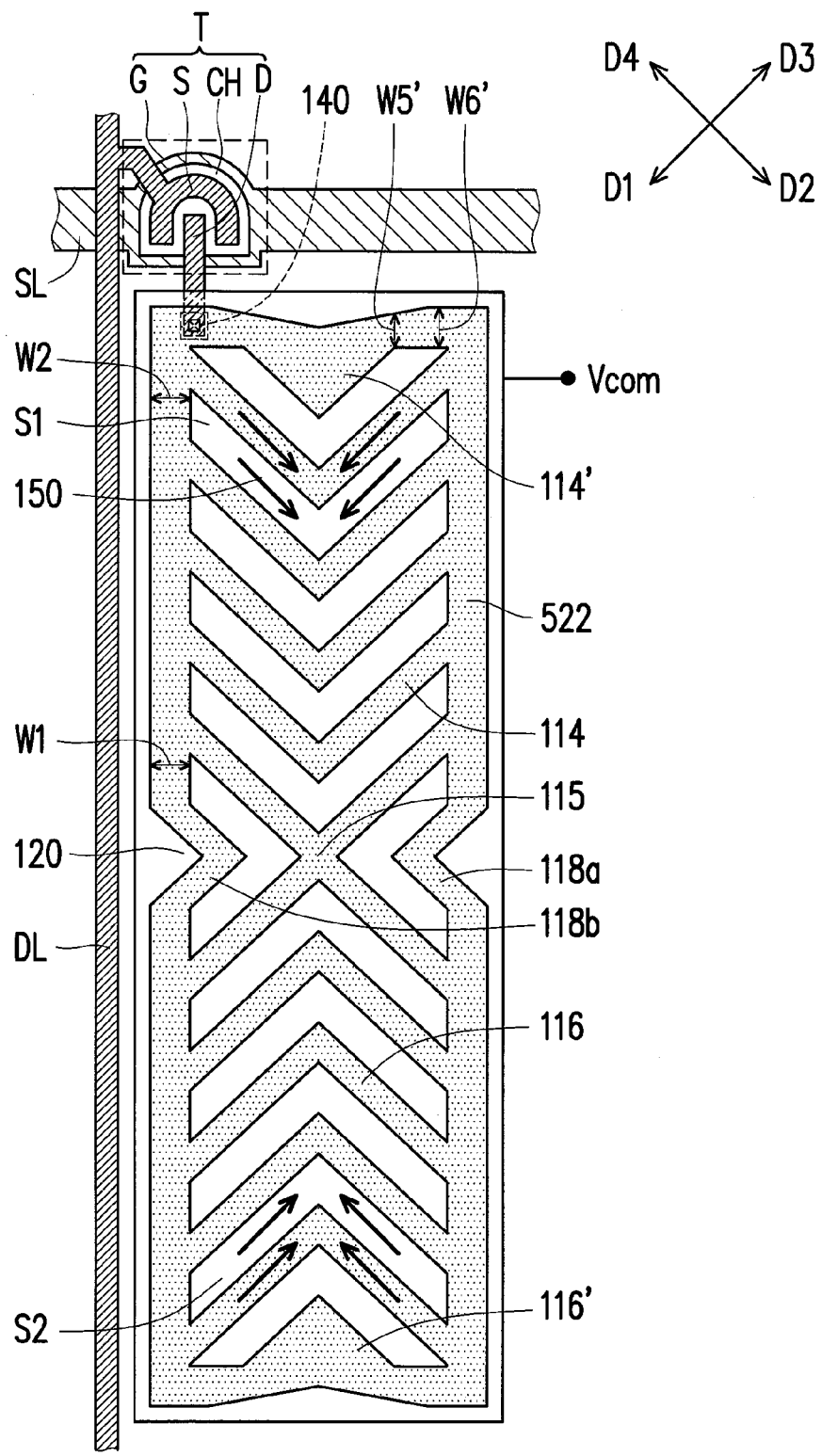

FIG. 6 is a schematic top view illustrating a pixel structure 501 according to a fifth embodiment of the invention and FIG. 7 is a schematic top view illustrating a pixel structure 502 according to another embodiment showing variations in said pixel structure 501. The embodiments depicted in FIG. 6 and FIG. 7 are similar to that depicted in FIG. 2; therefore, the identical or similar devices in these embodiments are represented by the identical or similar reference numbers and will not be further explained. The difference between the embodiments depicted in FIG. 6 and FIG. 7 and the embodiment depicted in FIG. 2 lies in that the width of the enclosed-frame-shaped portion adjacent to the farthest V-shaped branch portion is different from the width of the enclosed-frame-shaped portion away from the farthest V-shaped branch portion, which will be elaborated hereinafter.

In the pixel structure 501 shown in FIG. 6, the width of the enclosed-frame-shaped portion 512 gradually increases in a direction away from the farthest first and second V-shaped branch portions 114' and 116', and the width W5' is smaller than the width W6'. That is, the width of the enclosed-frame-shaped portion 512 gradually increases in a direction from the farthest first and second V-shaped branch portions 114' and 116' toward away the farthest first and second V-shaped branch portions 114' and 116'. Nevertheless, the invention should not be construed as limited to the embodiment set forth herein. According to another embodiment, the width W5' of the enclosed-frame-shaped portion 512 adjacent to the farthest first and second V-shaped branch portions 114' and 116' may be smaller than the width W6' of the enclosed-frame-shaped portion 512 away from the farthest first and second V-shaped branch portions 114' and 116'.

In the pixel structure 502 shown in FIG. 7, the width of the enclosed-frame-shaped portion 522 gradually increases in a direction away from the farthest first and second V-shaped branch portions 114' and 116', and the width W5' is smaller than the width W6'. That is, the width of the enclosed-frame-shaped portion 522 gradually increases in a direction from the farthest first and second V-shaped branch portions 114' and 116' toward away the farthest first and second V-shaped branch portions 114' and 116'. Besides, in the pixel structure 502 shown in FIG. 7, the direction D1 is a 43-degree direction, and the direction D2 is a 137-degree direction, for instance; therefore, the V-shaped openings of the first and second V-shaped branch portions 114 and 116 are rather large.

According to the previous embodiment, the central parts have pointed-end patterns, and the widths W8 of the end terminals of the V-shaped branch portions are equal to the widths W7 of the central parts of the V-shaped branch portions, for instance. Nevertheless, the invention should not be construed as limited to the embodiment set forth herein. In other embodiments of the invention, e.g., in the sixth embodiment, the seventh embodiment, and another embodiment showing variations in the sixth and seventh embodiments, the patterns of the central parts may be different, or the widths of the end terminals of the V-shaped branch portions may be different from the widths of the central parts of the V-shaped branch portions, which will be elaborated hereinafter.

Figure 8:
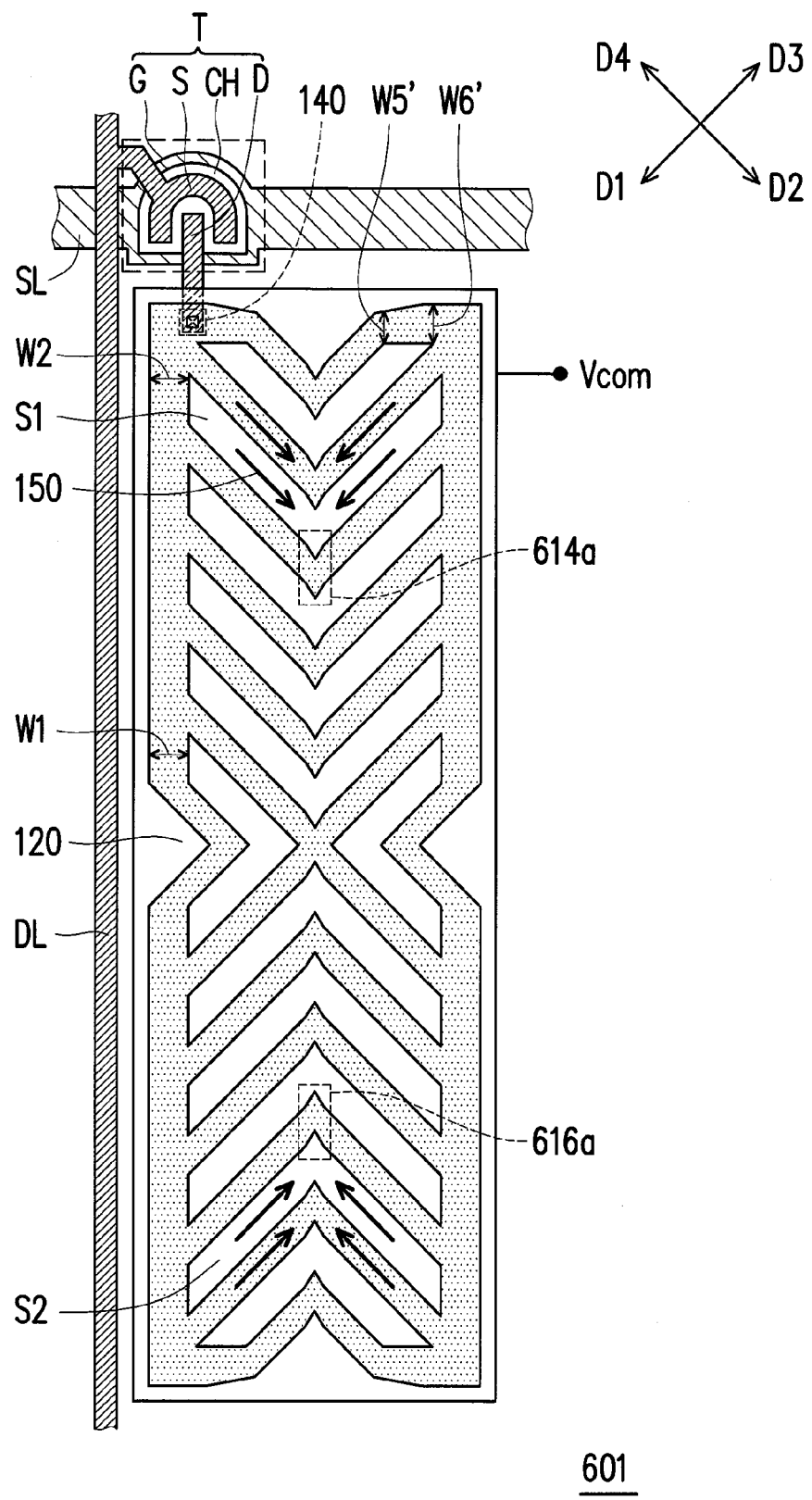
FIG. 8 is a schematic top view illustrating a pixel structure according to a sixth embodiment of the invention and FIG. 9 to FIG. 11 are schematic top views illustrating pixel structures according to other embodiments showing variations in the pixel structure described in the sixth embodiment.
Figure 9:
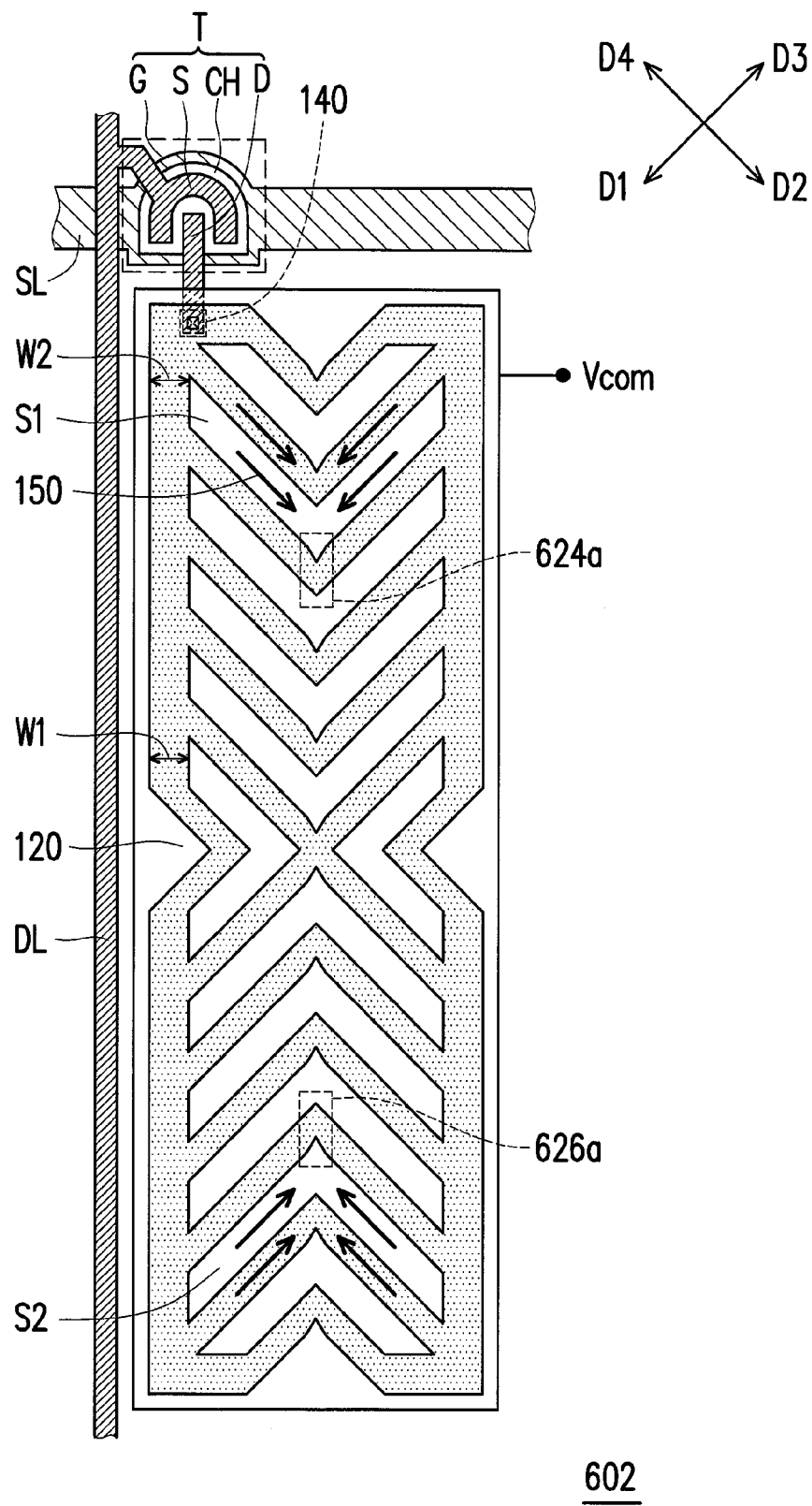
Figure 10:
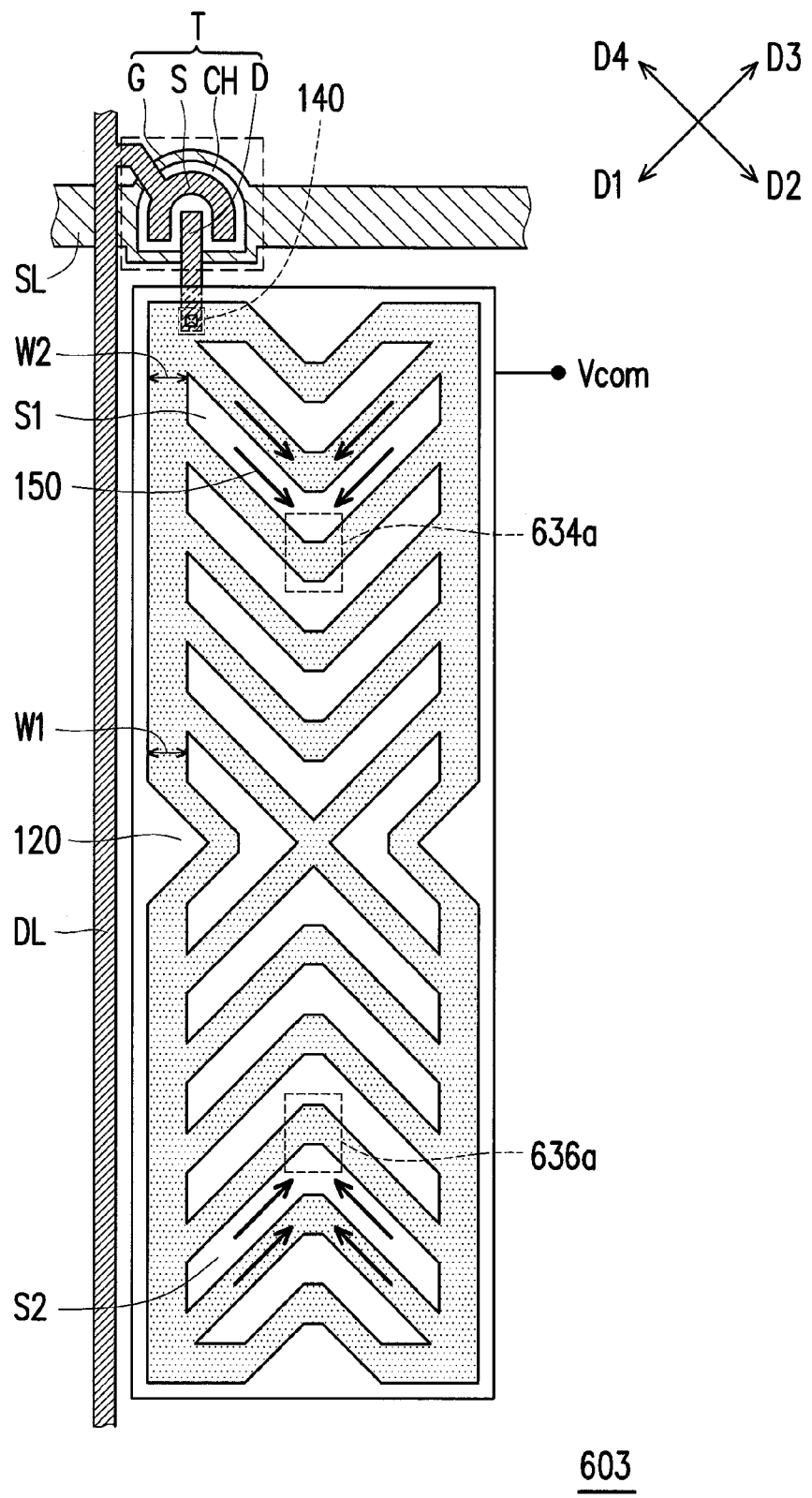
Figure 11:
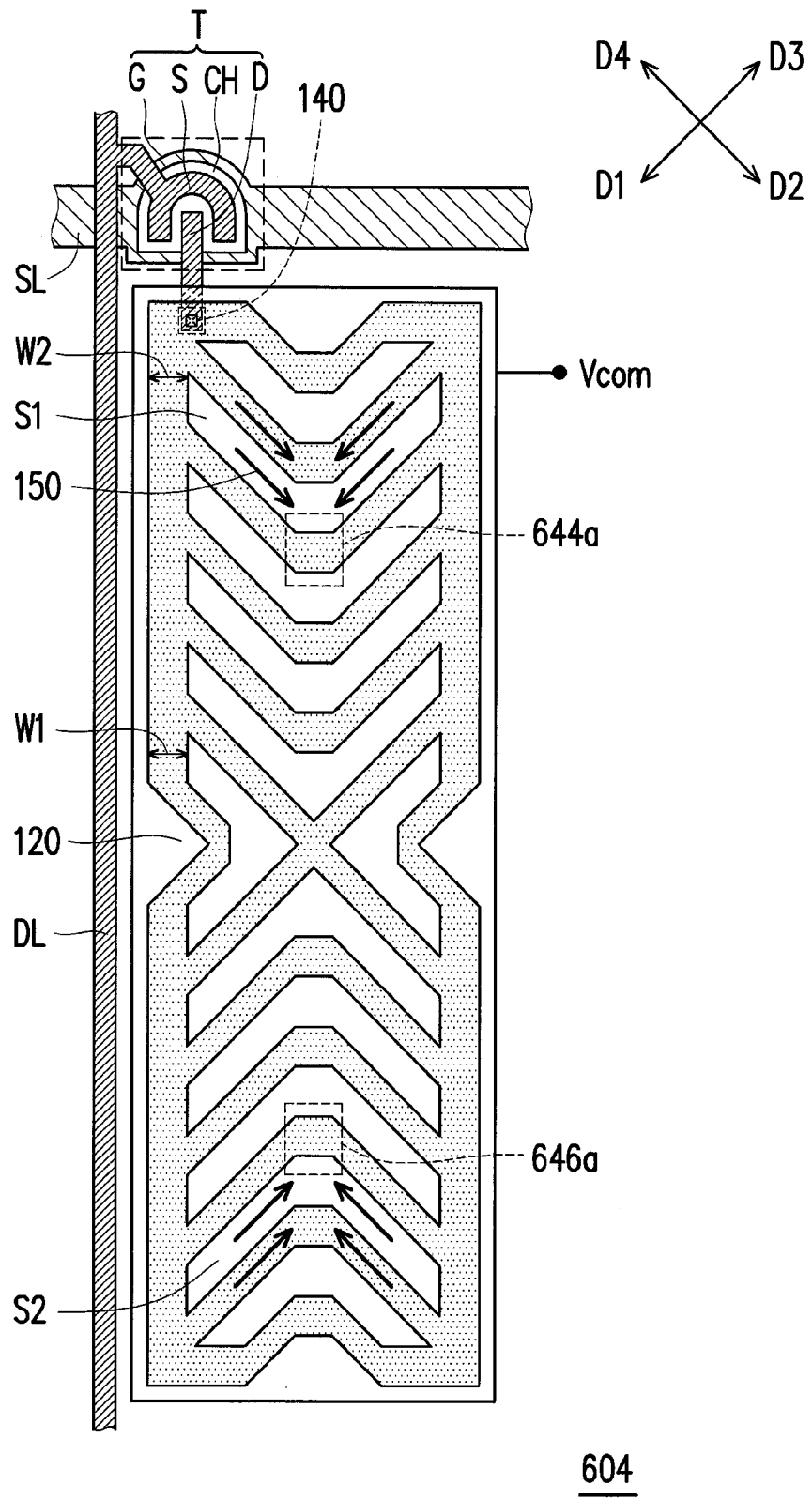

FIG. 8 is a schematic top view illustrating a pixel structure 601 according to a sixth embodiment of the invention and FIG. 9 to FIG. 11 are schematic top views illustrating pixel structures 602 to 604 according to other embodiments showing variations in the pixel structure 601. The embodiments depicted in FIG. 8 to FIG. 11 are similar to that depicted in FIG. 2; therefore, the identical or similar devices in these embodiments are represented by the identical or similar reference numbers and will not be further explained. The difference between the embodiments depicted in FIG. 8 to FIG. 11 and the embodiment depicted in FIG. 2 refers to the difference in the patterns of the central parts. Specifically, the inner and outer angles of the pointed-end patterns of the first and second central parts 614a and 616a in the pixel structure 601 shown in FIG. 8 are rather small, i.e., the patterns of the first and second central parts 614a and 614b are tapered to a great extent; compared to the outer angle, the inner angle of the pointed-end patterns of the first and second central parts 624a and 626a in the pixel structure 602 shown in FIG. 9 is rather small, i.e., the patterns of the first and second central parts 624a and 626a are tapered to a great extent. Besides, the first and second central parts 634a and 636a in the pixel structure 603 shown in FIG. 10 have flat-top patterns, and so do the first and second central parts 644a and 646a in the pixel structure 604 shown in FIG. 11. Note that the lengths of the flat-top patterns shown in FIG. 11 are greater than those of the flat-top patterns shown in FIG. 10.

Figure 12:
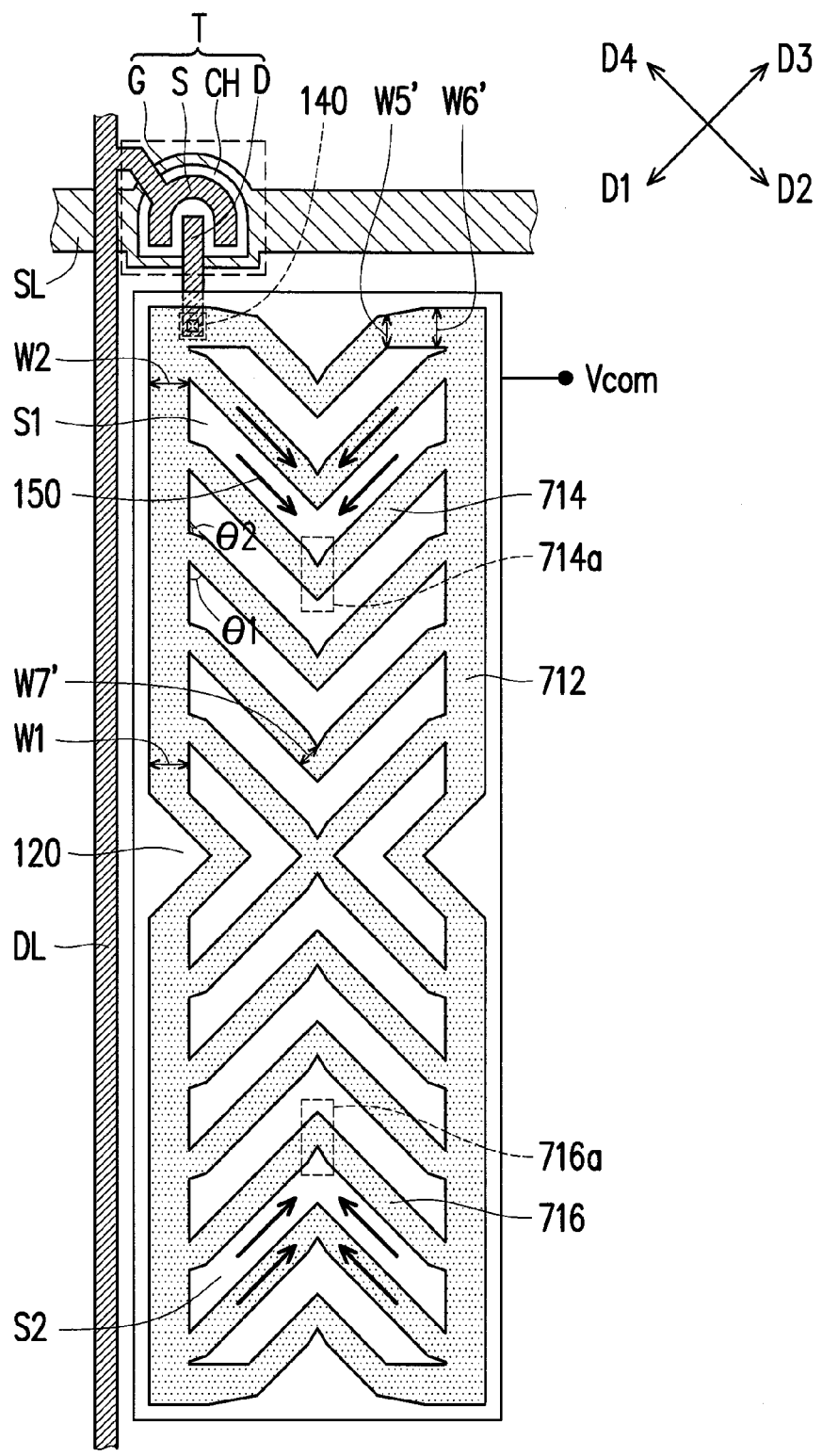
FIG. 12 is a schematic top view illustrating a pixel structure according to a seventh embodiment of the invention and FIG. 13 to FIG. 16 are schematic top views illustrating pixel structures according to other embodiments showing variations in the pixel structure described in the seventh embodiment.

FIG. 12 is a schematic top view illustrating a pixel structure 701 according to a seventh embodiment of the invention and FIG. 13 to FIG. 16 are schematic top views illustrating pixel structures 702 to 705 according to other embodiments showing variations in the pixel structure 701. The embodiments depicted in FIG. 12 to FIG. 16 are similar to that depicted in FIG. 2; therefore, the identical or similar devices in these embodiments are represented by the identical or similar reference numbers and will not be further explained. The difference between the embodiments depicted in FIG. 12 to FIG. 16 and the embodiment depicted in FIG. 2 refers to the difference in the widths of the end terminals and the widths of the central parts of the V-shaped branch portions.

In the pixel structure 701 illustrated in FIG. 12, the width of the end terminal of each first V-shaped branch portion 714 is different from the width W7' of the first central part 714a of each first V-shaped branch portion 714, and the width of the end terminal of each second V-shaped branch portion 716 is different from the width W7' of the second central part 716a of each second V-shaped branch portion 716. In particular, an included angle θ1 is between an outer side of each first V-shaped branch portion 714 and the enclosed-frame-shaped portion 712, an included angle θ2 is between an inner side of each first V-shaped branch portion 714 and the enclosed-frame-shaped portion 712, and the inner side of each first V-shaped branch portion 714 has a bent portion that is adjacent to the enclosed-frame-shaped portion 712, such that θ1+θ2<180 degrees. Similarly, an included angle θ1 is between an outer side of each second V-shaped branch portion 716 and the enclosed-frame-shaped portion 712, an included angle θ2 is between an inner side of each second V-shaped branch portion 716 and the enclosed-frame-shaped portion 712, and the inner side of each second V-shaped branch portion 716 has a bent portion that is adjacent to the enclosed-frame-shaped portion 712, such that θ1+θ2<180 degrees. In the present embodiment, the shape of the enclosed-frame-shaped portion 712 may be any shape of the aforesaid enclosed-frame-shaped portions provided in the previous embodiments. Moreover, in the present embodiment, the pointed-end patterns of the first and second central parts 714a and 716a are identical to the pointed-end patterns of the first and second central parts 624a and 626a, i.e., compared to the outer angles, the inner angles of the pointed-end patterns are rather small. However, the invention is not limited thereto, and the patterns of the first and second central parts 714a and 716a in other embodiments may be any of the aforesaid pointed-end or flat-top patterns described in the previous embodiments.

Figure 13:
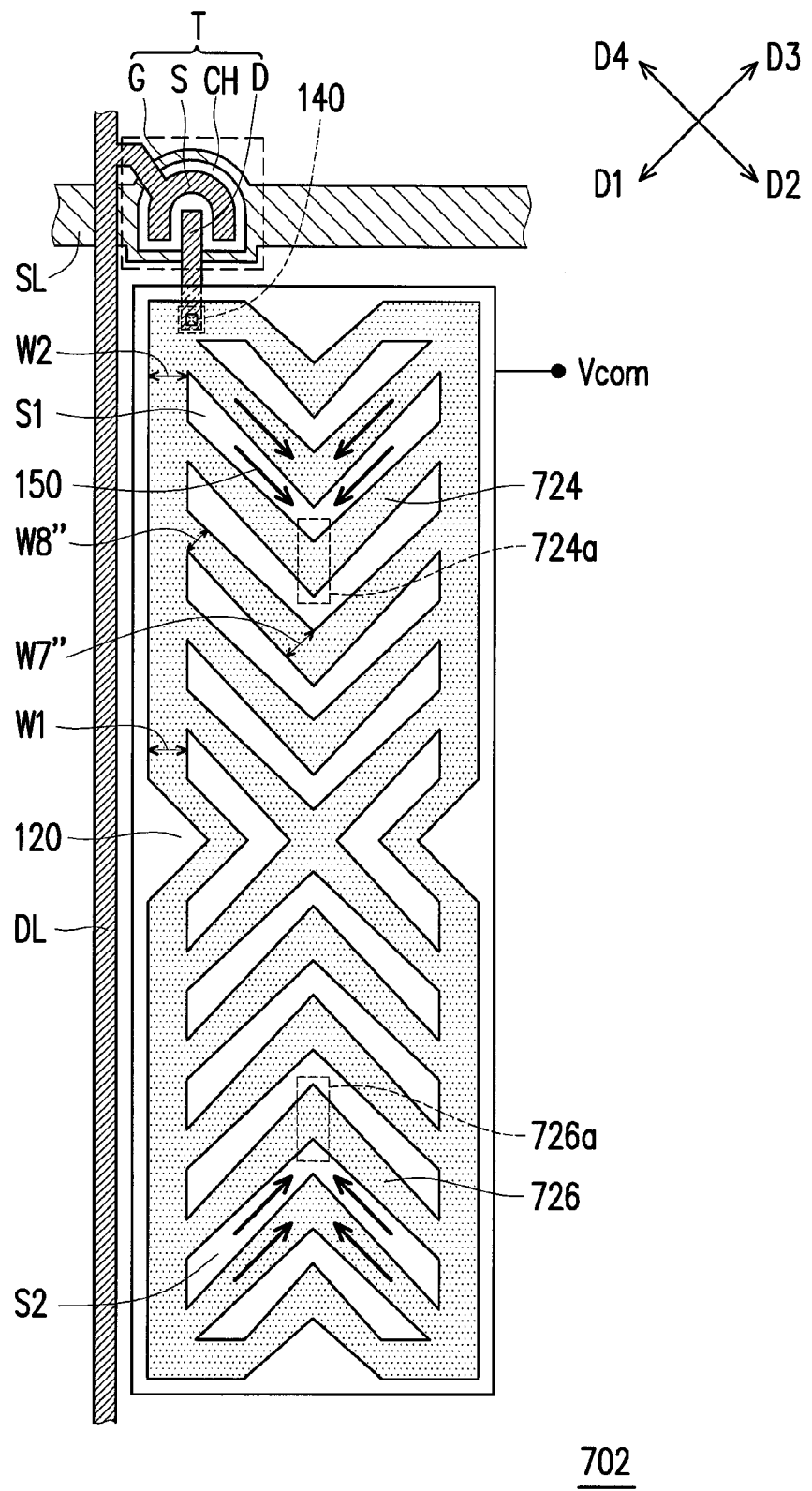

In the pixel structure 702 depicted in FIG. 13, the width of each first V-shaped branch portions 724 gradually decreases in a direction away from the first central part 724a, the width of each second V-shaped branch portions 726 gradually decreases in a direction away from the second central part 726a, and the width W8" is smaller than the width W7". That means, the width of each first V-shaped branch portions 724 gradually decreases in a direction from the first central part 724a toward away the first central part 724a. The width of each second V-shaped branch portions 726 gradually decreases in a direction from the second central part 726a toward away the second central part 726a.

Figure 14:
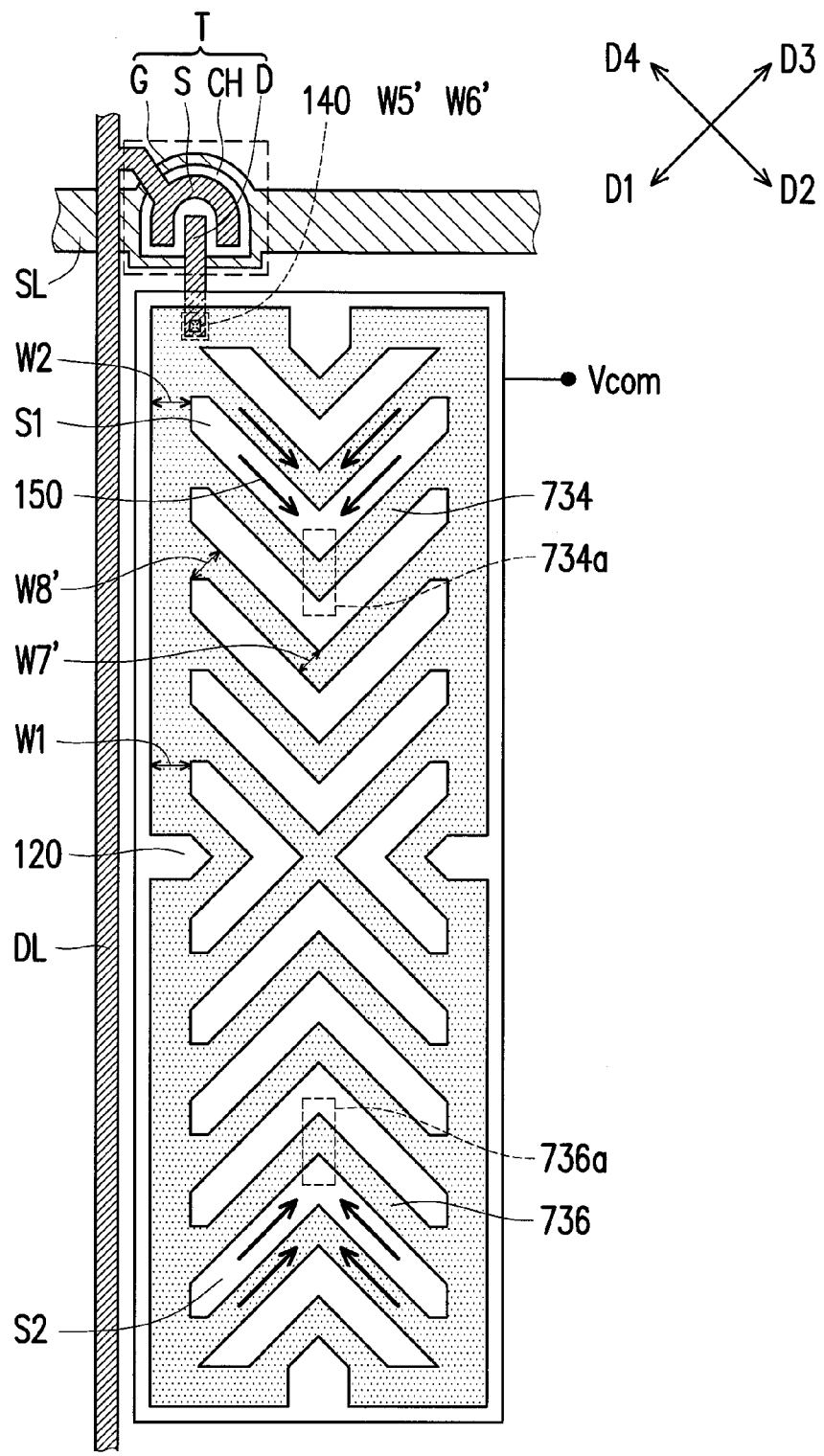

In the pixel structure 703 illustrated in FIG. 14, the width W8' of the end terminal of each first V-shaped branch portion 734 is greater than the width W7' of the first central part 734a of each first V-shaped branch portion 734, and the width W8' of the end terminal of each second V-shaped branch portion 736 is greater than the width W7' of the second central part 736a of each second V-shaped branch portion 736.

Figure 15:
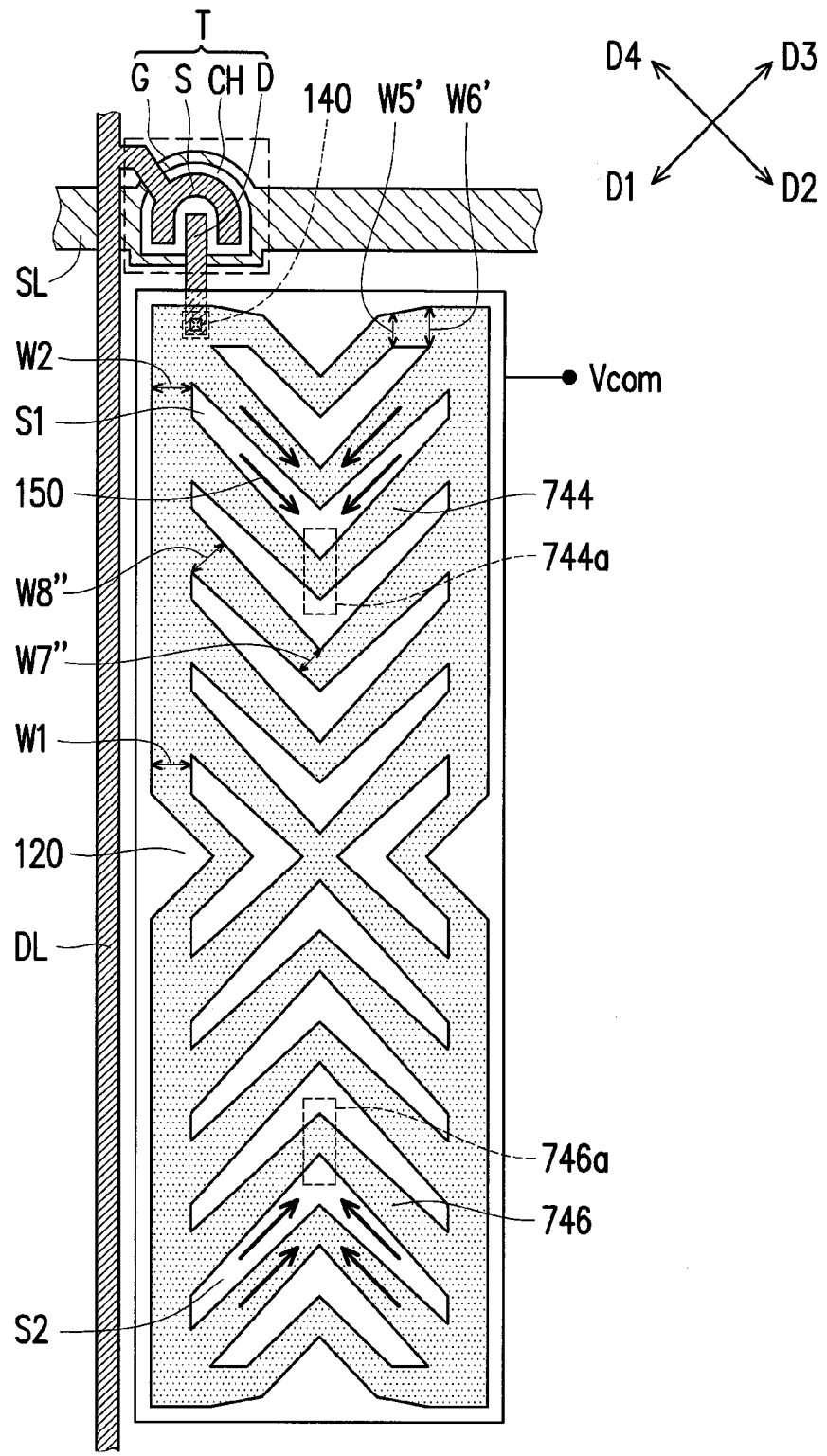

In the pixel structure 704 depicted in FIG. 15, the width of each first V-shaped branch portions 744 gradually increases in a direction away from the first central part 744a, the width of each second V-shaped branch portions 746 gradually increases in a direction away from the second central part 746a, and the width W8" is greater than the width W7". That means, the width of each first V-shaped branch portions 744 gradually increases in a direction from the first central part 744a toward away the first central part 744a. The width of each second V-shaped branch portions 746 gradually increases in a direction from the second central part 746a toward away the second central part 746a.

Figure 16:
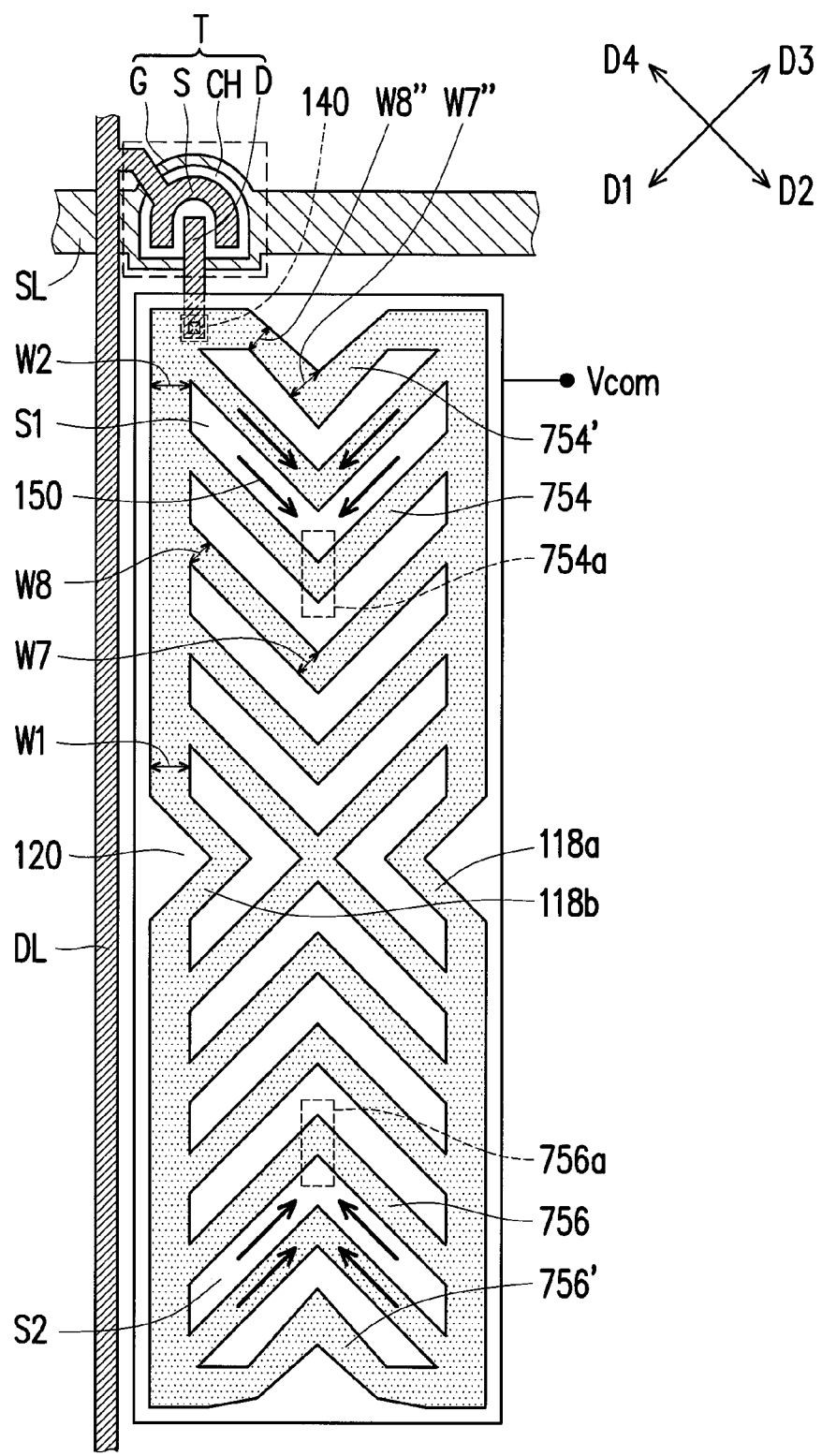

In the pixel structure 705 depicted in FIG. 16, the width of the farthest first V-shaped branch portion 754' gradually decreases in a direction away from the first central part 754a, the width of the farthest second V-shaped branch portion 756' gradually decreases in a direction away from the second central part 756a, and the width W8" is smaller than the width W7". That is, the width of the farthest first V-shaped branch portion 754' gradually decreases in a direction from the first central part 754a toward away the first central part 754a, the width of the farthest second V-shaped branch portion 756' gradually decreases in a direction from the second central part 756a toward away the second central part 756a. The widths W8 of the end terminals of the other first V-shaped branch portions 754 are greater than the widths W7 of the first central parts 754a, and the widths W8 of the end terminals of the other second V-shaped branch portions 756 are greater than the widths W7 of the second central parts 756a. However, the invention is not limited thereto, and the widths of some of the first and second V-shaped branch portions may be the same as those described above or may be a combination derived from the above embodiments.

The enclosed-frame-shaped portion described in each of the previous embodiments has the recess patterns, for instance. Nevertheless, the invention should not be construed as limited to the embodiment set forth herein. In another embodiment (e.g., the eighth embodiment) of the invention, the enclosed-frame-shaped portion may be rectangular, and the recess patterns are located within the enclosed-frame-shaped portion, which will be elaborated hereinafter.

Figure 17:
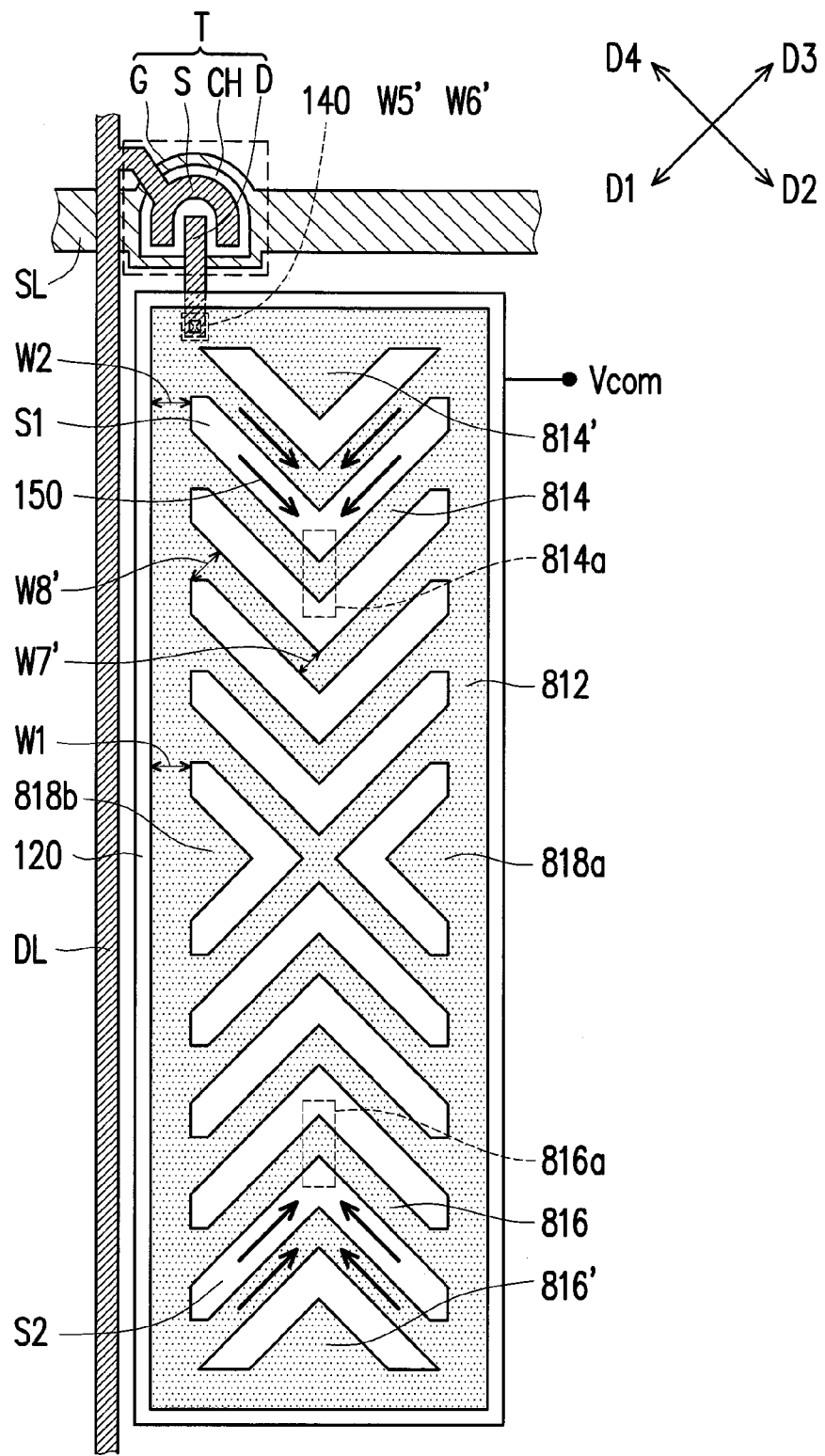
FIG. 17 is a schematic top view illustrating a pixel structure according to an eighth embodiment of the invention and FIG. 18 is schematic top view illustrating a pixel structure according to another embodiment showing variations in the pixel structure depicted in FIG. 17.
Figure 18:
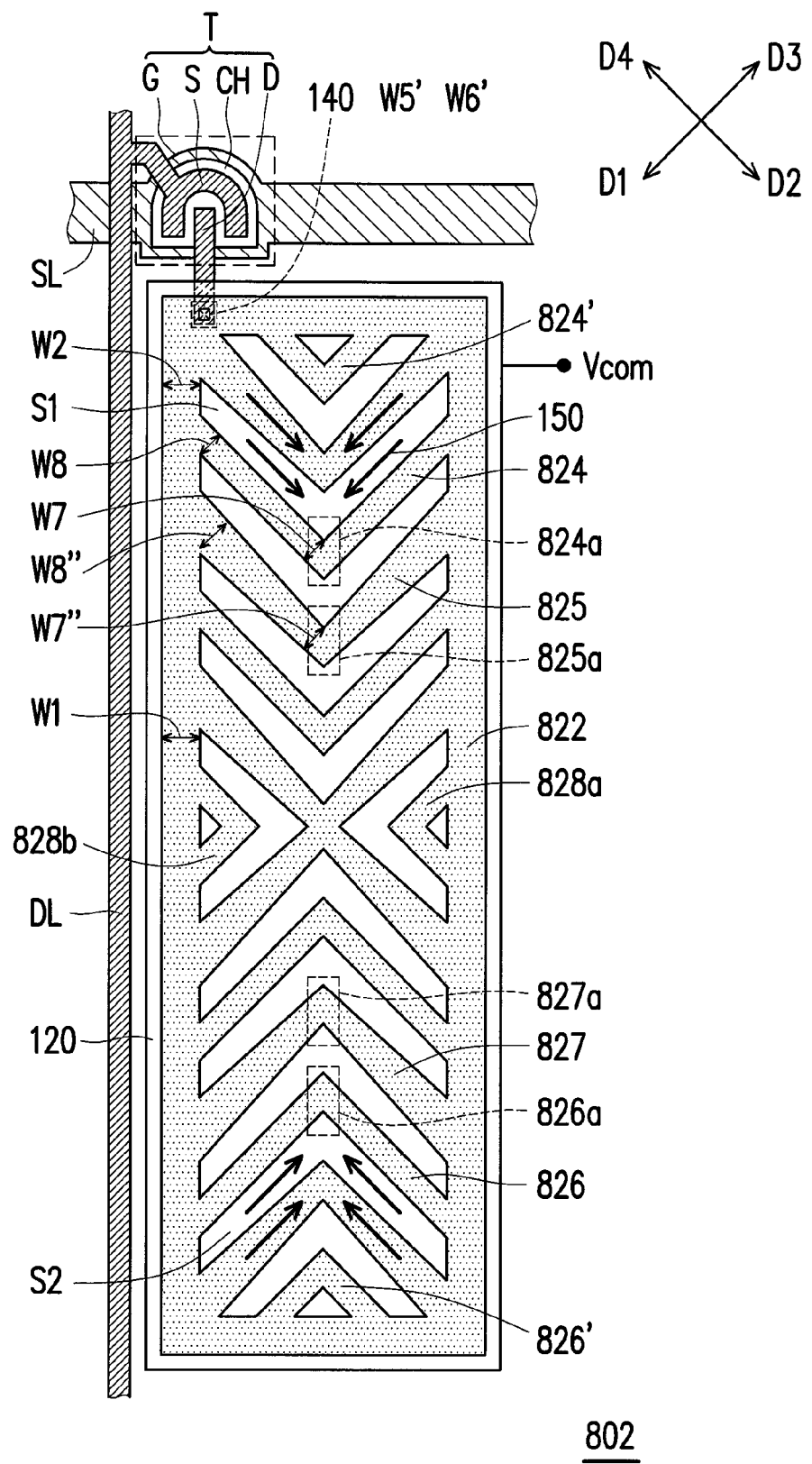

FIG. 17 is a schematic top view illustrating a pixel structure 801 according to an eighth embodiment of the invention and FIG. 18 is schematic top view illustrating a pixel structure 802 according to another embodiment showing variations in the pixel structure 801. The embodiments depicted in FIG. 17 and FIG. 18 are similar to that depicted in FIG. 2; therefore, the identical or similar devices in these embodiments are represented by the identical or similar reference numbers and will not be further explained. The difference between the embodiments depicted in FIG. 17 and FIG. 18 and the embodiment depicted in FIG. 2 refers to the difference in the shape of the enclosed-frame-shaped portion, which will be elaborated below.

In the pixel structure 801 depicted in FIG. 17, the enclosed-frame-shaped portion 812 is rectangular, and the first and second recess patterns 818a and 818b are located within the enclosed-frame-shaped portion 812. The farthest first and second V-shaped branch portions 814' and 816' are also located within the enclosed-frame-shaped portion 812. Besides, in the present embodiment, the width W8' of the end terminal of each first V-shaped branch portion 814 is greater than the width W7' of the first central part 814a of each first V-shaped branch portion 814, and the width W8' of the end terminal of each second V-shaped branch portion 816 is greater than the width W7' of the second central part 816a of each second V-shaped branch portion 816. Therefore, the pixel structure 801 described in the present embodiment is similar to the pixel structure 703 with the rectangular enclosed-frame-shaped portion. However, the invention is not limited thereto, and the pixel structure in other embodiments of the invention may be any of the aforesaid pixel structures with the rectangular enclosed-frame-shaped portion.

In the pixel structure 802 depicted in FIG. 18, the enclosed-frame-shaped portion 822 is rectangular, and the first and second recess patterns 828a and 828b are located within the enclosed-frame-shaped portion 828. The farthest first and second V-shaped branch portions 824' and 826' are also located within the enclosed-frame-shaped portion 822. In the present embodiment, the V-shaped branch portions with the same width and the V-shaped branch portions with different widths are alternately arranged. Specifically, the first V-shaped branch portions 824 and 825 are alternately arranged, and the second V-shaped branch portions 826 and 827 are alternately arranged. The first V-shaped branch portions 824 and the second V-shaped branch portions 826 have the same width. Namely, the widths W8 of the end terminals of the first V-shaped branch portions 824 are equal to the widths W7 of the first central parts 824a, and the widths W8 of the end terminals of the second V-shaped branch portions 826 are equal to the widths W7 of the second central parts 826a. The first V-shaped branch portions 825 and the second V-shaped branch portions 827 have different widths. Particularly, the widths of the first V-shaped branch portions 825 gradually increase in a direction away from the first central parts 825a, the widths of the second V-shaped branch portions 827 gradually increase in a direction away from the second central parts 827a, and the width W8" is greater than the width W7". That is, the widths of the first V-shaped branch portions 825 gradually increase in a direction from the first central parts 825a toward away the first central parts 825a. The widths of the second V-shaped branch portions 827 gradually increase in a direction from the second central parts 827a toward away the second central parts 827a. However, the invention is not limited thereto, and the shape of the V-shaped branch portions and the shape of the enclosed-frame-shaped portion in other embodiments of the invention may be any of the aforesaid shapes.

In the previous embodiment, the end terminals of the first V-shaped branch portions and the end terminals of the second V-shaped branch portions do not protrude from the enclosed-frame-shaped portion, for instance. Nevertheless, the invention should not be construed as limited to the embodiment set forth herein. In another embodiment (e.g., the ninth embodiment) of the invention, the end terminals of the first V-shaped branch portions and the end terminals of the second V-shaped branch portions may protrude from the enclosed-frame-shaped portion, which will be elaborated hereinafter.

Figure 19:
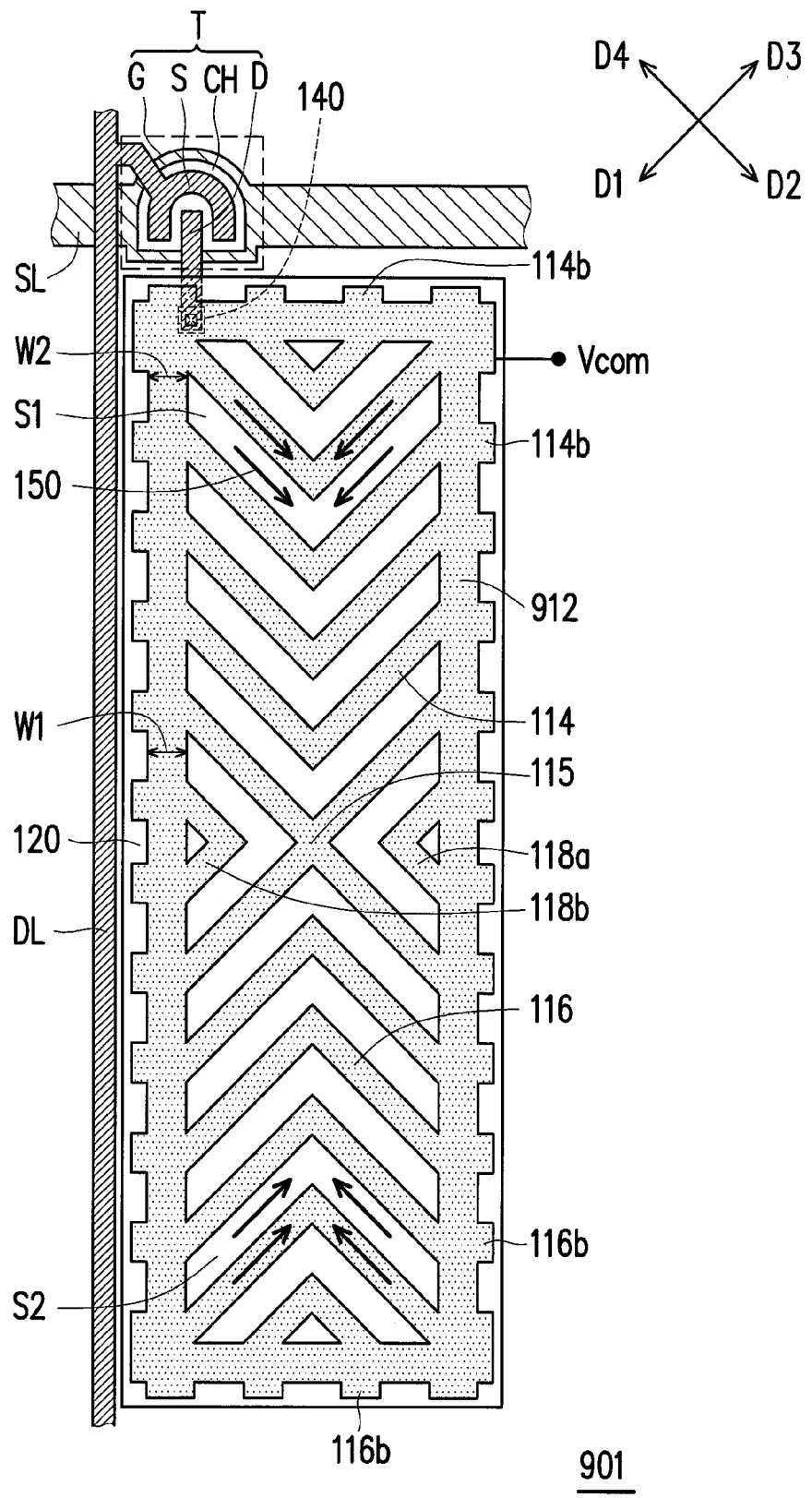
FIG. 19 is a schematic top view illustrating a pixel structure according to a ninth embodiment of the invention.

FIG. 19 is a schematic top view illustrating a pixel structure 901 according to a ninth embodiment of the invention. The embodiment depicted in FIG. 19 is similar to that depicted in FIG. 2; therefore, the identical or similar devices in these two embodiments are represented by the identical or similar reference numbers and will not be further explained. The difference between the embodiment depicted in FIG. 19 and the embodiment depicted in FIG. 2 lies in that the end terminals of the first V-shaped branch portions and the end terminals of the second V-shaped branch portions protrude from the enclosed-frame-shaped portion according to the present embodiment. Particularly, in the pixel structure 901 illustrated in FIG. 19, the end terminals of the first V-shaped branch portions 114 have the first protrusions 114b protruding from the enclosed-frame-shaped portion 912, and the end terminals of the second V-shaped branch portions 116 have the second protrusions 116b protruding from the enclosed-frame-shaped portion 912. Besides, in the present embodiment, the enclosed-frame-shaped portion 912 may be rectangular, which should however not be construed as a limitation to the invention; in other embodiments of the invention, the enclosed-frame-shaped portion may be shaped in any manner provided in the previous embodiments.

Figure 20:
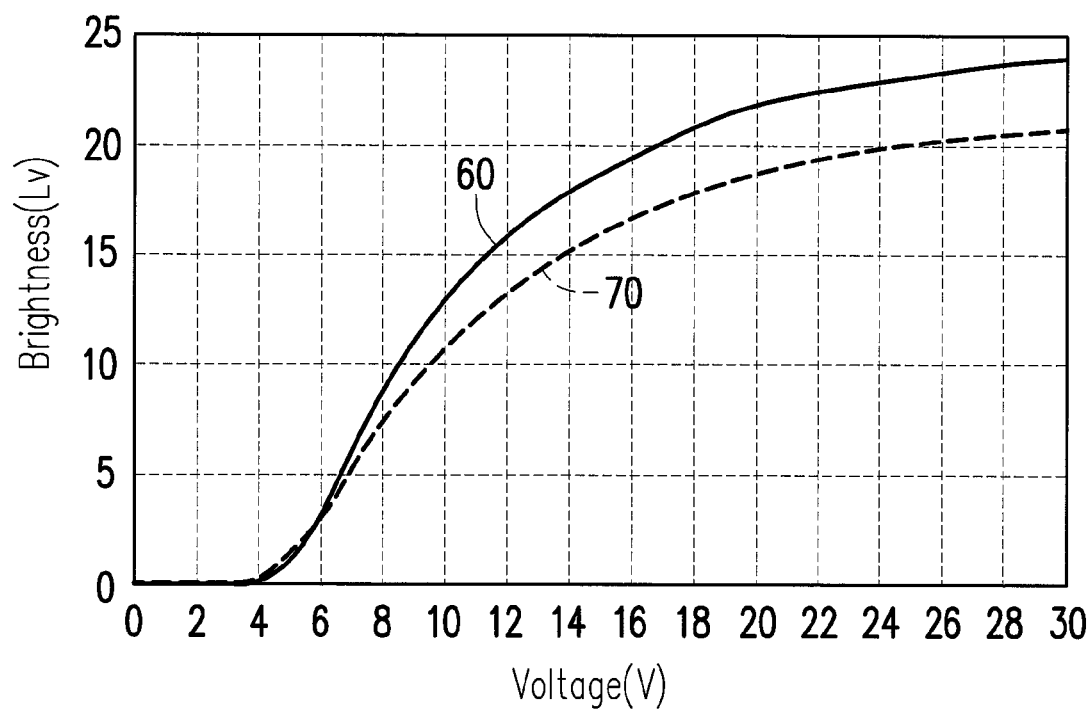
FIG. 20 is a curve diagram illustrating a brightness-voltage relationship in an LCD panel according to an experimental example and a comparison example.

To prove that the pixel structure described herein and equipped with the V-shaped branch portions and the V-shaped slits undoubtedly contributes to the favorable transmittance and satisfactory display quality of the LCD panel, an experimental example is provided hereinafter. FIG. 20 is a curve diagram illustrating a brightness-voltage (Lv-V) relationship in an LCD panel according to an experimental example and a comparison example. In the experimental example, the LCD panel has the pixel structure 100 shown in FIG. 2; that is, in the LCD panel, the liquid crystal molecules above the V-shaped branch portions of the pixel electrode and the liquid crystal molecules above the V-shaped slits are tilted in the same direction. By contrast, in the comparison example, the LCD panel is an FFS LCD panel with the conventional pixel structure; namely, in the LCD panel, the liquid crystal molecules above the V-shaped branch portions of the pixel electrode and the liquid crystal molecules above the alignment slits are tilted in different directions. Curves 60 and 70 respectively represent the brightness-voltage relationship in the LCD panel according to the experimental example and the comparison example. It can be learned from FIG. 20 that the pixel structure provided in the experimental example may have favorable transmittance without triggering the issue of disclination lines or disclination nodes because the liquid crystal molecules above the V-shaped branch portions of the pixel electrode and the liquid crystal molecules above the V-shaped slits are tilted in the same direction. That is, compared to the LCD panel with the conventional pixel structure, the LCD panel equipped with the pixel structure having the V-shaped branch portions and the V-shaped silts have the transmittance improved by 20% approximately.

To sum up, in the pixel structure provided herein, the first V-shaped branch portions and the second V-shaped branch portions are arranged within the enclosed-frame-shaped portion in opposite directions, and the end terminals of the first V-shaped branch portions and the end terminals of the second V-shaped branch portions are connected to the enclosed-frame-shaped portion. Thereby, the conventional issue that the liquid crystal molecules above pixel electrodes are tilted in a direction different from that of the liquid crystal molecules above alignment slits does not arise. That is, in the pixel structure described herein, the liquid crystal molecules above the V-shaped branch portions of the pixel electrodes and the liquid crystal molecules above the alignment slits are tilted in the same direction, such that the pixel structure provided herein may have favorable transmittance without triggering the issue of disclination lines or disclination nodes. As such, the resultant LCD panel may have sufficient transmittance and satisfactory display quality.

Although the invention has been described with reference to the above exemplary embodiments, it will be apparent to one of ordinary skill in the art that modifications to the described exemplary embodiments may be made without departing from the spirit of the invention. Accordingly, the scope of the invention will be defined by the attached claims and not by the above detailed descriptions.

What is claimed is:

1. A pixel structure comprising:
   a scan line and a data line;
   an active device electrically connected to the scan line and the data line;
   a first electrode layer electrically connected to the active device;
   a second electrode layer electrically insulated from the first electrode layer; and
   an insulation layer located between the first electrode layer and the second electrode layer, wherein the first electrode layer or the second electrode layer comprises:
      an enclosed-frame-shaped portion, wherein the enclosed-frame-shaped portion has a first recess pattern and a second recess pattern; and
      a plurality of first V-shaped branch portions and a plurality of second V-shaped branch portions arranged within the enclosed-frame-shaped portion in opposite directions, wherein end terminals of the first V-shaped branch portions and end terminals of the second V-shaped branch portions are connected to the enclosed-frame-shaped portion, and the first and second recess patterns are located between adjacent first and second V-shaped branch portions.

2. The pixel structure as recited in claim 1, wherein each of the first V-shaped branch portions has a first central part, each of the second V-shaped branch portions has a second central part, and the first central parts and the second central parts are arranged in opposite directions.

3. The pixel structure as recited in claim 2, wherein the first central parts and the second central parts have pointed-end patterns or flat-top patterns.

4. The pixel structure as recited in claim 2, wherein a width of the end terminal of each of the first V-shaped branch portions is equal to a width of the first central part of each of the first V-shaped branch portions, and a width of the end terminal of each of the second V-shaped branch portions is equal to a width of the second central part of each of the second V-shaped branch portions.

5. The pixel structure as recited in claim 2, wherein a width of the end terminal of each of the first V-shaped branch portions is different from a width of the first central part of each of the first V-shaped branch portions, and a width of the end terminal of each of the second V-shaped branch portions is different from a width of the second central part of each of the second V-shaped branch portions.

6. The pixel structure as recited in claim 5, wherein a width of each of the first V-shaped branch portions gradually decreases in a direction from the first central part toward away the first central part, and a width of each of the second V-shaped branch portions gradually decreases in a direction from the second central part toward away the second central part.

7. The pixel structure as recited in claim 5, wherein the width of the end terminal of each of the first V-shaped branch portions is greater than the width of the first central part of each of the first V-shaped branch portions, and the width of the end terminal of each of the second V-shaped branch portions is greater than the width of the second central part of each of the second V-shaped branch portions.

8. The pixel structure as recited in claim 7, wherein a width of each of the first V-shaped branch portions gradually increases in a direction from the first central part toward away the first central part, and a width of each of the second V-shaped branch portions gradually increases in a direction from the second central part toward away the second central part.

9. The pixel structure as recited in claim 1, wherein the end terminals of the first V-shaped branch portions and the end terminals of the second V-shaped branch portions do not protrude from the enclosed-frame-shaped portion, such that the enclosed-frame-shaped portion has an outer edge shaped as a straight line.

10. The pixel structure as recited in claim 1, wherein the end terminals of the first V-shaped branch portions and the end terminals of the second V-shaped branch portions protrude from the enclosed-frame-shaped portion.

11. The pixel structure as recited in claim 1, wherein the enclosed-frame-shaped portion is rectangular, and the first and second recess patterns are located within the enclosed-frame-shaped portion.

12. The pixel structure as recited in claim 1, wherein a width of the enclosed-frame-shaped portion adjacent to the first and second recess patterns is equal to a width of the enclosed-frame-shaped portion away from the first and second recess patterns.

13. The pixel structure as recited in claim 1, wherein a width of the enclosed-frame-shaped portion adjacent to the first and second recess patterns is smaller than a width of the enclosed-frame-shaped portion away from the first and second recess patterns.

14. The pixel structure as recited in claim 13, wherein the width of the enclosed-frame-shaped portion gradually increases in a direction from the first and second recess patterns toward away the first and second recess patterns.

15. The pixel structure as recited in claim 1, wherein the first V-shaped branch portions comprise a farthest first V-shaped branch portion, and the second V-shaped branch portions comprise a farthest second V-shaped branch portion.

16. The pixel structure as recited in claim 15, wherein the enclosed-frame-shaped portion is rectangular, and the farthest first and second V-shaped branch portions are located within the enclosed-frame-shaped portion.

17. The pixel structure as recited in claim 15, wherein a width of the enclosed-frame-shaped portion adjacent to the farthest first and second V-shaped branch portions is equal to a width of the enclosed-frame-shaped portion away from the farthest first and second V-shaped branch portions.

18. The pixel structure as recited in claim 15, wherein a width of the enclosed-frame-shaped portion adjacent to the farthest first and second V-shaped branch portions is smaller than a width of the enclosed-frame-shaped portion away from the farthest first and second V-shaped branch portions.

19. The pixel structure as recited in claim 18, wherein the width of the enclosed-frame-shaped portion gradually increases in a direction from the farthest first and second V-shaped branch portions toward away the farthest first and second V-shaped branch portions.

20. The pixel structure as recited in claim 1, wherein the first V-shaped branch portions comprise a plurality of first wide V-shaped branch portions and a plurality of first narrow V-shaped branch portions, and the first wide V-shaped branch portions and the first narrow V-shaped branch portions are alternately arranged.

21. The pixel structure as recited in claim 1, wherein the second V-shaped branch portions comprise a plurality of second wide V-shaped branch portions and a plurality of second narrow V-shaped branch portions, and the second wide V-shaped branch portions and the second narrow V-shaped branch portions are alternately arranged.

22. The pixel structure as recited in claim 1, wherein adjacent first and second V-shaped branch portions are connected to constitute a crisscross-shaped pattern.

23. The pixel structure as recited in claim 1, wherein a first V-shaped slit is located between two of the first V-shaped branch portions adjacent to each other, a second V-shaped slit is located between two of the second V-shaped branch portions adjacent to each other, and the first V-shaped slits and the second V-shaped slits are arranged within the enclosed-frame-shaped portion in opposite directions.

24. A pixel structure comprising:
a scan line and a data line;
an active device electrically connected to the scan line and the data line;
a first electrode layer electrically connected to the active device;
a second electrode layer electrically insulated from the first electrode layer; and
an insulation layer located between the first electrode layer and the second electrode layer, wherein the first electrode layer or the second electrode layer comprises:
an enclosed-frame-shaped portion; and
a plurality of first V-shaped branch portions and a plurality of second V-shaped branch portions arranged within the enclosed-frame-shaped portion in opposite directions, wherein end terminals of the first V-shaped branch portions and end terminals of the second V-shaped branch portions are connected to the enclosed-frame-shaped portion, and adjacent first and second V-shaped branch portions are connected to constitute a crisscross-shaped pattern.

* * * * *